United States Patent
Ohno et al.

(10) Patent No.: US 9,137,277 B2
(45) Date of Patent: Sep. 15, 2015

(54) COMMUNICATION METHOD, COMMUNICATION SYSTEM, REPEATING APPARATUS, COMMUNICATION APPARATUS, AND COMPUTER PROGRAM PRODUCT

(75) Inventors: Takashi Ohno, Kawasaki (JP); Kenichi Horio, Kawasaki (JP); Jun Kakuta, Kawasaki (JP); Satoshi Okuyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 2214 days.

(21) Appl. No.: 11/447,138

(22) Filed: Jun. 6, 2006

(65) Prior Publication Data

US 2007/0121669 A1    May 31, 2007

(30) Foreign Application Priority Data

Nov. 29, 2005   (JP) .................................. 2005-344566

(51) Int. Cl.
| | |
|---|---|
| H04J 3/22 | (2006.01) |
| H04L 29/06 | (2006.01) |
| H04W 4/10 | (2009.01) |
| H04W 76/00 | (2009.01) |
| H04W 72/00 | (2009.01) |

(52) U.S. Cl.
CPC ............. *H04L 65/4061* (2013.01); *H04W 4/10* (2013.01); *H04W 76/005* (2013.01); *H04W 72/005* (2013.01)

(58) Field of Classification Search
USPC ........... 709/204–207, 217–219; 370/464–546
See application file for complete search history.

(56) References Cited

U.S. PATENT DOCUMENTS

| | | | |
|---|---|---|---|
| 7,536,180 B2 * | 5/2009 | Yoon et al. ..................... | 455/418 |
| 2003/0157945 A1 * | 8/2003 | Chen et al. ..................... | 455/458 |
| 2005/0181815 A1 * | 8/2005 | Shostak ........................ | 455/519 |

(Continued)

FOREIGN PATENT DOCUMENTS

| | | |
|---|---|---|
| DE | 10 2004 005 720 B3 | 8/2005 |
| JP | 6-266632 | 9/1994 |

(Continued)

OTHER PUBLICATIONS

European Search Report dated Feb. 27, 2009 and issued in corresponding European Patent Application 06252423.6.

(Continued)

*Primary Examiner* — Thai Nguyen
(74) *Attorney, Agent, or Firm* — Staas & Halsey LLP

(57) ABSTRACT

A communication apparatus going to acquire transmission right accepts input of specifying a communication apparatus as a main target of output among other communication apparatuses, and then performs multi-address calling of output data to the other communication apparatuses. At executing output processing on the basis of the output data, the specified communication apparatus executes output processing such as image output and voice output for notifying the fact of being specified. In a system of PoC service or the like where one communication apparatus among a plurality of communication apparatuses acquires transmission right of transmitting voice data, and then performs multi-address calling of voice data to a plurality of the other communication apparatuses, it is avoided that a target person of speech who is a main target of transmission of voice data among all users operating the other communication apparatuses fails to listen to a speech.

36 Claims, 12 Drawing Sheets

(56) References Cited

U.S. PATENT DOCUMENTS

2005/0190740 A1* 9/2005 Zhao et al. .................... 370/349
2005/0202806 A1* 9/2005 Bourgeois et al. ............ 455/416

FOREIGN PATENT DOCUMENTS

| JP | 06-266632 A | 9/1994 |
|---|---|---|
| JP | 7-212733 | 8/1995 |
| JP | 11-341458 | 12/1999 |
| JP | 2001-188740 A | 7/2001 |
| JP | 2005-149529 A | 6/2005 |

OTHER PUBLICATIONS

Japanese Office Action mailed Feb. 2, 2010 in Japanese Patent Application No. 2005-344566.

* cited by examiner

FIG. 5

1st COMMUNICATION APP. 1a

START → S201 ACCEPT INPUT OF VOICE → S202 TRANSMIT VOICE DATA

REPEATING APP. 2

S203 RECEIVE VOICE DATA → S204 PERFORM MULTI-ADDRESS CALLING OF VOICE DATA

2nd COMMUNICATION APP. 1b

S205 RECEIVE VOICE DATA → S206 ITSELF HAS BEEN SPECIFIED?

YES → S207 EXECUTE OUTPUT PROCESSING INDICATING RECEIVING OF VOICE DATA SPECIFIED AS MAIN TARGET OF OUTPUT → S208 RETAIN VOICE DATA → S209 EXECUTE VOICE OUTPUT PROCESSING → RETURN

NO → S210 EXECUTE OUTPUT PROCESSING INDICATING OF RECEIVING VOICE DATA → S211 EXECUTE VOICE OUTPUT PROCESSING → RETURN

FIG. 10

1st COMMUNICATION APP. 1a

START → S601 ACCEPT INPUT OF SPECIFYING 2nd COMMUNICATION APP. → S602 ACCEPT INPUT OF VOICE → S603 TRANSMIT VOICE DATA

REPEATING APP. 2

S604 RECEIVE VOICE DATA → S605 PERFORM MULTI-ADDRESS CALLING OF VOICE DATA

2nd COMMUNICATION APP. 1b

S606 RECEIVE VOICE DATA → S607 ITSELF HAS BEEN SPECIFIED?

YES → S608 EXECUTE OUTPUT PROCESSING INDICATING RECEIVING OF VOICE DATA SPECIFIED AS MAIN TARGET OF OUTPUT → S609 RETAIN VOICE DATA → S610 EXECUTE VOICE OUTPUT PROCESSING → RETURN

NO → S611 EXECUTE OUTPUT PROCESSING INDICATING RECEIVING VOICE DATA → S612 EXECUTE VOICE OUTPUT PROCESSING → RETURN

COMMUNICATION METHOD, COMMUNICATION SYSTEM, REPEATING APPARATUS, COMMUNICATION APPARATUS, AND COMPUTER PROGRAM PRODUCT

CROSS-REFERENCE TO RELATED APPLICATIONS

This Nonprovisional application claims priority under 35 U.S.C. §119(a) on Patent Application No. 2005-344566 filed in Japan on Nov. 29, 2005, the entire contents of which are hereby incorporated by reference.

BACKGROUND OF THE INVENTION

1. Field of the Invention

The present invention relates to: a communication method in which a plurality of communication apparatuses and a repeating apparatus for relaying communication among these communication apparatuses are employed, while one communication apparatus having acquired transmission right performs multi-address calling (point-to-multipoint communication) of output data to the other communication apparatuses, and while each communication apparatus having received the output data executes output processing on the basis of the received output data; a communication system employing such communication method; and a repeating apparatus and a communication apparatus employed in such communication system. Further, the present invention relates to a computer program product for implementing each of the repeating apparatus and the communication apparatus described above. In particular, the present invention relates to a communication method, a communication system, a repeating apparatus, a communication apparatus, and a computer program product applicable to a PoC (Push-to-Talk over Cellular) service in which the technique of IP (Internet Protocol) telephone is utilized as that of transceivers so that a packet containing voice data is transmitted to a plurality of apparatuses by multi-address calling.

2. Description of Related Art

Recently, the use of real-time applications such as VoIP (Voice over Internet Protocol), VoPN (Voice over Packet Network), streaming, and the like is increasing in which voice data and video data are transmitted and received between apparatuses via a communication network such as an IP (Internet Protocol) network. Thus, IP telephone serving as an example is spreading rapidly. In the IP telephone, packeted voice data is transmitted and received via an IP network so that telephone call is realized between an apparatus on the packet transmitting side and an apparatus on the packet receiving side.

Further, attention is focused on a PoC (Push-to-Talk over Cellular) service in which the technique of IP (Internet Protocol) telephone is utilized as that of transceivers so that a packet containing voice data is transmitted to a plurality of apparatuses by multi-address calling. As a feature of the PoC service, half duplex communication is adopted in which one apparatus among a plurality of the apparatuses acquires speaking right for transmitting voice data and then this one apparatus having acquired transmission right performs multi-address calling of voice data to a plurality of the other apparatuses. This permits simultaneous communication among three or more apparatuses. Here, at the time of transmission of the voice data, which apparatus (user) has presently the speaking right is notified to each apparatus. This allows all members to recognize who is providing the speech outputted on the basis of the voice data.

Here, a communication system employing half duplex communication in which one apparatus among a plurality of apparatuses acquires transmission right (speaking right) capable of transmitting voice data and then the one apparatus having acquired transmission right performs multi-address calling of voice data to a plurality of the other apparatuses has been proposed as an electronic conferencing system in addition to the PoC service system described above (see Japanese Patent Application Laid-Open No. 6-266632 (1994)).

In such a system like the PoC service system, the electronic conferencing system, and the like that realizes one-to-a-plurality conversation by means of multi-address calling of voice data from one apparatus having acquired speaking right to a plurality of the other apparatuses, time, effort, and cost are reduced that is necessary for transmitting the same contents to each person. Further, even in a case that a speech is intrinsically directed to one specific person, when a speaking person having acquired speaking right transmits the contents also to the other persons by multi-address calling, the information is shared among all the members including the persons other than the intrinsic target person of speech. This is another advantage.

Nevertheless, in a conventional system such as the PoC service system, the electronic conferencing system, and the like, which apparatus (user) has presently the speaking right is notified, but to whom the speech is directed, that is, the target person of speech, is not identified. This has caused a fear that the target person of speech may fail to listen to the speech. On the contrary, in order that the fear of failing to listen should be avoided reliably, each user need listen to all speeches carefully even for speeches not important for the specific user. This has caused a problem of time and effort.

BRIEF SUMMARY OF THE INVENTION

The present invention has been devised in view of such situation. An object of the present invention is to provide: a communication method in which a speaking person specifies a target person of speech at the time of a speech while the fact of being specified is notified to the specified target person of speech, so that the target person of speech is prevented from failing to listen to the speech while not-specified persons can do, for example, other work with listening to the speech in parallel so that working efficiency is improved; a communication system employing such communication method; a repeating apparatus and a communication apparatus used in such communication system; a computer program product for implementing such repeating apparatus; and a computer program product for implementing such communication apparatus.

A communication method according to the present invention is a communication method in which a plurality of communication apparatuses are employed, while multi-address calling of output data is performed from one communication apparatus having acquired transmission right to the other communication apparatuses, and while each communication apparatus having received the output data executes output processing on the basis of the received output data, and is characterized by comprising the steps of by a communication apparatus going to acquire transmission right, accepting input of specifying as a main target of output a communication apparatus among the other communication apparatuses; by the communication apparatus going to acquire transmission right, performing multi-address calling of output data to the other communication apparatuses; and by the communication apparatus specified by the communication apparatus going to acquire transmission right, executing output processing indicating the fact of being specified.

According to the communication method of the present invention, a communication apparatus can be specified as a main target of transmission of output data, while the user of the specified communication apparatus can understand the fact of being specified. Thus, for example, when the output data is voice data for outputting voice, the user of the specified communication apparatus does not fail to listen to the voice. Further, the users of not-specified communication apparatuses can do, for example, other work with listening to the speech in parallel. This improves working efficiency.

A first aspect of the communication system according to the present invention is a communication system in which a plurality of communication apparatuses are included while multi-address calling of output data is performed from one communication apparatus having acquired transmission right to the other communication apparatuses, and is characterized in that the communication apparatus going to acquire transmission right comprises: specifying means for accepting input of specifying as a main target of output a communication apparatus among the other communication apparatuses; and means for performing multi-address calling of output data to the other communication apparatuses, and each communication apparatus other than the communication apparatus going to acquire transmission right comprises: means for executing output processing on the basis of the received output data; and means for executing output processing indicating the fact of being specified when specified by the communication apparatus going to acquire transmission right.

According to the first aspect of the communication system of the present invention, a communication apparatus can be specified as a main target of transmission of output data, while the specified communication apparatus can understand the fact of being specified. Thus, for example, when the output data is voice data for outputting voice, the user of the specified communication apparatus does not fail to listen to the voice. Further, the users of not-specified communication apparatuses can do, for example, other work with listening to the speech in parallel. This improves working efficiency.

A second aspect of the communication system according to the present invention is, in the first aspect, characterized in that the communication apparatus specified by the communication apparatus going to acquire transmission right further comprises: accumulating means for retaining the received output data; and means for executing output processing on the basis of the output data retained in the accumulating means, when input of requesting re-output is accepted.

According to the second aspect of the communication system of the present invention, the output data is retained in the specified communication apparatus. This permits re-output. Thus, the user of the specified communication apparatus can reconfirm important output contents.

A third aspect of the communication system according to the present invention is, in the first aspect, characterized further including a repeating apparatus for relaying communication among a plurality of communication apparatuses, wherein the repeating apparatus comprises recording means for retaining the output data received from the one communication apparatus, corresponding to information indicating the specified communication apparatus, the communication apparatus specified by the communication apparatus going to acquire transmission right further comprises means for transmitting to the repeating apparatus a retransmission request for output data when input of requesting re-output of the output data is accepted, and the repeating apparatus further comprises means for transmitting the output data retained in the recording means to the apparatus as the transmission source of the retransmission request, on the basis of the received retransmission request.

According to the third aspect of the communication system of the present invention, the output data is retained corresponding to the specified apparatus information. Retransmission of this output data can be requested from the specified communication apparatus. Thus, the user of the specified communication apparatus can reconfirm important output contents.

A fourth aspect of the communication system according to the present invention is, in any one of the first aspect through the third aspect, characterized in that, at the time of requesting the acquisition of transmission right, the specifying means accepts input of specifying a communication apparatus as a main target of output.

According to the fourth aspect of the communication system of the present invention, when a communication apparatus requests the acquisition of transmission right, input of specifying a communication apparatus as a main target of output is accepted.

A fifth aspect of the communication system according to the present invention is, in any one of the first aspect through the third aspect, characterized in that, at the time of transmitting the output data, the specifying means accepts input of specifying a communication apparatus as a main target of output.

According to the fifth aspect of the communication system of the present invention, when a communication apparatus transmits the output data, input of specifying a communication apparatus as a main target of output is accepted.

A sixth aspect of the communication system according to the present invention is, in the fifth aspect, characterized in that, at the time of transmitting the output data, when the specifying of a communication apparatus as a main target of output is accepted, the specifying means further notifies the specified communication apparatus to the other communication apparatuses.

According to the sixth aspect of the communication system of the present invention, at the time that the communication apparatus transmits the output data, when the specifying of a communication apparatus as a main target of output is accepted, the information of the specified communication apparatus is notified to the other communication apparatuses A seventh aspect of the communication system according to the present invention is, in any one of the first aspect through the sixth aspect, characterized in that the output data contains the information indicating the specified communication apparatus, and the each communication apparatus further comprises means for judging whether the apparatus itself has been specified, on the basis of the information contained in the received output data.

According to the seventh aspect of the communication system of the present invention, the output data contains information indicating the specified communication apparatus. Thus, on the basis of the information contained in the output data received by each communication apparatus, each communication apparatus can judge whether the apparatus itself has been specified.

An eighth aspect of the communication system according to the present invention is, in any one of the first aspect through the seventh aspect, characterized in that the each communication apparatus further comprises voice inputting means for accepting input of voice, and voice outputting means for outputting voice, the output data is voice data based on the voice the input of which has been accepted by the voice inputting means, and the means for executing output processing causes the voice outputting means to output voice on the basis of the voice data.

According to the eighth aspect of the communication system of the present invention, the present invention is applicable to a system such as a PoC service system and an electronic conferencing system in which a speech is shared between a plurality of persons.

A ninth aspect of the communication system according to the present invention is, in the fifth aspect, is characterized in that each communication apparatus further comprises means for changing the sound volume of the voice outputted from the voice outputting means so as to heighten the sound volume when specified by the communication apparatus going to acquire transmission right and/or lower the sound volume when not specified.

According to the ninth aspect of the communication system of the present invention, sound volume can be changed in the voice outputted from a communication apparatus specified by the communication apparatus going to acquire transmission right.

A tenth aspect of the communication system according to the present invention is, in any one of the first aspect through the ninth aspect, characterized in that the each communication apparatus further comprises means for granting transmission right to the specified communication apparatus, when acquired transmission right is released.

According to the tenth aspect of the communication system of the present invention, when transmission right is released, the already specified communication apparatus can acquire the next transmission right. This allows, for example, the user of the specified communication apparatus, by newly acquiring the transmission right, can reply rapidly to a call from the user of the communication apparatus to which had acquired the transmission right.

An eleventh aspect of the communication system according to the present invention is, in the tenth aspect, characterized in that the communication apparatus to which transmission right has been granted further comprises means for specifying the communication apparatus having released transmission right.

According to the eleventh aspect of the communication system of the present invention, a communication apparatus to which transmission right has been granted can specify the communication apparatus having released transmission right.

A twelfth aspect of the communication system according to the present invention is, in the tenth aspect, characterized in that the repeating apparatus further comprises means for granting transmission right to the specified communication apparatus when requests for acquiring transmission right are provided from a plurality of communication apparatuses after the one communication apparatus has released acquired transmission right.

According to the twelfth aspect of the communication system of the present invention, when requests for acquiring transmission right are provided from a plurality of communication apparatuses after the one communication apparatus has released acquired transmission right, the repeating apparatus grants transmission right to the specified communication apparatus.

A thirteenth aspect of the communication system according to the present invention is, in any one of the first aspect through the twelfth aspect, characterized in that the specifying means accepts input of specifying a plurality of communication apparatuses.

According to the thirteenth aspect of the communication system of the present invention, a plurality of communication apparatuses can be specified.

A repeating apparatus according to the present invention is a repeating apparatus for relaying communication among a plurality of communication apparatuses and performing multi-address calling of output data transmitted from one communication apparatus having acquired transmission right to the other communication apparatuses, and is characterized by comprising: means for receiving, from the one communication apparatus, output data for specifying a communication apparatus as a main target of output among the other communication apparatuses; recording means for retaining the received output data corresponding to information indicating the specified communication apparatus; means for performing multi-address calling of the output data received from the one communication apparatus to the other communication apparatuses; means for receiving from the specified communication apparatus a retransmission request for the output data; and means for transmitting the output data retained in the recording means to the communication apparatus as the transmission source of the retransmission request, on the basis of the received retransmission request.

According to the repeating apparatus of the present invention, the output data is retained corresponding to the specified apparatus information, while retransmission of this output data can be requested from the specified communication apparatus. Thus, the user of the specified communication apparatus can reconfirm important output contents.

A communication apparatus according to the present invention is a communication apparatus which is capable of performing communication with a plurality of other apparatuses, performs multi-address calling of output data to a plurality of the other apparatuses when transmission right is acquired, and executes output processing on the basis of output data when the output data is received, and is characterized by comprising: means for accepting input of specifying as a specified apparatus an apparatus as a main target of output among the other apparatuses; means for performing multi-address calling of output data to the other apparatuses; and means for executing output processing indicating the fact of being specified, when output data indicating the fact of being specified as the specified apparatus is received.

According to the communication apparatus of the present invention, an apparatus (user) can be specified as a main target of transmission of output data, while the specified user can understand the fact of being specified. Thus, for example, when the output data is voice data for outputting voice, the specified user does not fail to listen to the voice. Further, the not-specified users can do, for example, other work with listening to the speech in parallel. This improves working efficiency.

A computer program product for a repeating apparatus according to the present invention is a computer program product for controlling a computer which is connected with a recording unit for retaining data, and communication unit, relays communication among a plurality of communication apparatuses through the communication unit, and performing multi-address calling of output data transmitted from one communication apparatus having acquired transmission right to the other communication apparatuses through the communication unit, wherein the computer program product comprises: and is characterized in that a computer readable storage medium having computer readable program code means embodied in the medium, the computer readable program code means comprising computer instruction means for: causing the recording unit to retain received output data corresponding to information indicating a specified communication apparatus, when the communication unit receives output data specifying the communication apparatus as a main target of output among the other communication apparatuses from the one communication apparatus through the communication unit; and causing the communication unit to transmit the output data retained in the recording unit to the communication apparatus as the transmission source of a retransmission request on the basis of the received retransmission request, when the communication unit receives the retransmission request for the output data from the specified communication apparatus through the communication unit.

According to the computer program product for a repeating apparatus of the present invention, when it is installed and executed on a computer such as a server computer, the computer operates as a repeating apparatus of the present invention described above.

A computer program product for a communication apparatus according to the present invention is a computer program product for controlling a computer which is connected with an operation unit for accepting input operations by a user, a communication unit, and a data output unit for outputting data, capable of performing communication with a plurality of other apparatuses through the communication unit, performs multi-address calling of output data to a plurality of the other apparatuses through the communication unit when transmission right is acquired, and executes output processing by the data output unit on the basis of output data when the communication unit receives the output data, wherein the computer program product comprises: and is characterized in that a computer readable storage medium having computer readable program code means embodied in the medium, the computer readable program code means comprising computer instruction means for: causing the operation unit to accept input of specifying as a specified apparatus an apparatus to be a main target of output among the other apparatuses, at the time of multi-address calling of output data to the other apparatuses through the communication unit; and causing the data output unit to execute output processing indicating the fact of being specified, when the communication unit receives output data indicating the fact of being specified as the specified apparatus is received.

According to the computer program product for a communication apparatus of the present invention, when it is installed and executed on a computer such as an IP telephone terminal and a personal computer, the computer operates as a communication apparatus of the present invention described above.

In the communication method and the communication system according to the present invention described above, a plurality of communication apparatuses according to the present invention and a repeating apparatus according to the present invention for relaying communication among these communication apparatuses are employed so that multi-address calling is performed on output data such as voice data used when one communication apparatus having acquired transmission right causes the other communication apparatuses to output voice. Then, each communication apparatus having received the output data is applied to a system such as a PoC service system and an electronic conferencing system for performing output such as voice output on the basis of the received output data. Further, a communication apparatus going to acquire transmission right receives input of specifying a communication apparatus as a main target of output among the other communication apparatuses, and then performs multi-address calling of output data to the other communication apparatuses. When executing output processing on the basis of the output data, the specified communication apparatus executes output processing such as image output and voice output for notifying the fact of being specified.

According to such configuration, a communication apparatus can be specified as a main target of transmission of output data, while the user of the specified communication apparatus can understand the fact of being specified. Thus, for example, when the output data is voice data for outputting voice, the user of the specified communication apparatus does not fail to listen to the voice. Further, the users of not-specified communication apparatuses can do, for example, other work with listening to the speech in parallel. This improves working efficiency.

Further, according to the communication system of the present invention, the output data is retained in the specified communication apparatus or the repeating apparatus. Thus, re-output can be performed when necessary. Accordingly, the user of a specified communication apparatus can reconfirm important output contents.

Furthermore, according to the communication system of the present invention, when a communication apparatus having acquired transmission right releases the acquired transmission right, transmission right is granted to a specified communication apparatus, so that the already specified communication apparatus can acquire the next transmission right. This allows, for example, the user of the specified communication apparatus, by newly acquiring the transmission right, can reply rapidly to a call from the user of the communication apparatus to which had acquired the transmission right.

Further, according to the computer program product of the present invention, a computer onto which the computer program product has been installed can operate as a repeating apparatus or a communication apparatus according to the present invention described above.

The above and further objects and features of the invention will more fully be apparent from the following detailed description with accompanying drawings.

BRIEF DESCRIPTION OF THE SEVERAL VIEWS OF THE DRAWINGS

FIG. 5 is a flow chart showing an example of a procedure of apparatus-specified call processing performed by a communication apparatus and a repeating apparatus according to Embodiment 1 of the present invention;

FIG. 10 is a flow chart showing an example of a procedure of apparatus-specified call processing performed by a communication apparatus and a repeating apparatus according to Embodiment 2 of the present invention;

DETAILED DESCRIPTION OF THE PRESENT INVENTION

The present invention is described below in detail with reference to the drawings showing several embodiments.
(Embodiment 1)

Figure 1:
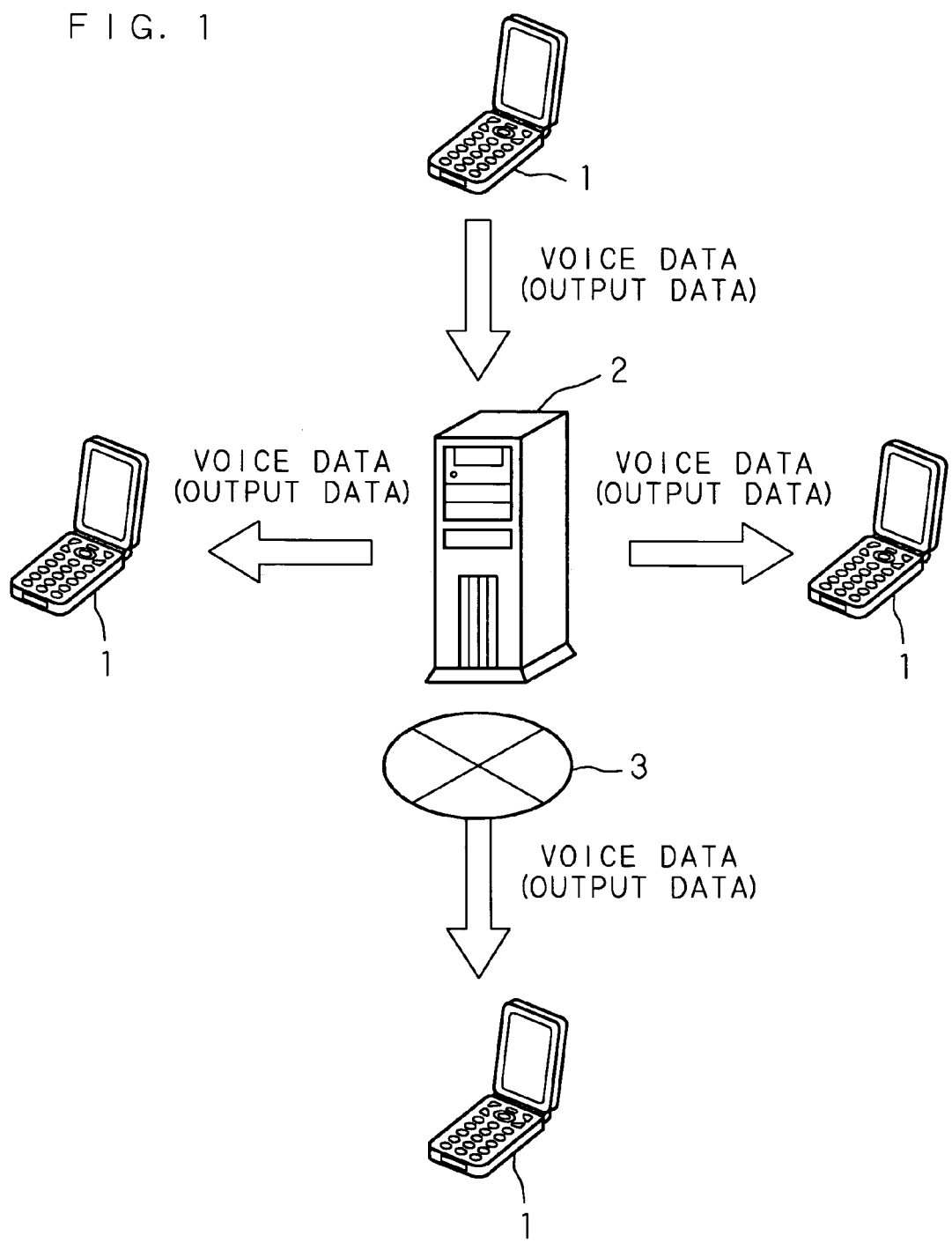
FIG. 1 is a conceptual diagram showing an example of the configuration of a communication system according to Embodiment 1 of the present invention.

FIG. 1 is a conceptual diagram showing an example of the configuration of a communication system according to Embodiment 1 of the present invention.

In FIG. 1, reference numerals 1, 1, . . . denote communication apparatuses according to the present invention each composed of a computer for communication such as an IP telephone terminal device provided with a transceiver function used in a PoC (Push-to-Talk over Cellular) service. One communication apparatus 1 is connected to a communication network 3 such as a VoIP (Voice over IP) network, and thereby performs packet communication with the other communication apparatuses 1, 1, . . . by virtue of a relaying function of a repeating apparatus 2 such as a PoC server computer.

The communication in the PoC service is half duplex communication performed among a plurality of grouped communication apparatuses 1, 1, . . . under the management of the repeating apparatus 2. Specifically, one communication apparatus 1 having acquired transmission right generates a packet containing voice data (output data) for outputting inputted voice, and then performs multi-address calling (point-to-multipoint communication) of the generated packet to the other communication apparatuses 1, 1, . . . via the repeating apparatus 2. Then, each communication apparatus 1 having received the packet containing voice data outputs the voice on the basis of the voice data contained in the received packet. The transmission right does not continue to be owned by the one communication apparatus 1, and can move to another communication apparatus 1 having requested transmission right. The packet containing voice data is in accordance with the specification of RTP (Real-time Transport Protocol) or the like which is a protocol used in VoIP communication. The voice mentioned here is not limited to sound uttered by a user, and includes sound at any audible frequency.

Figure 2:
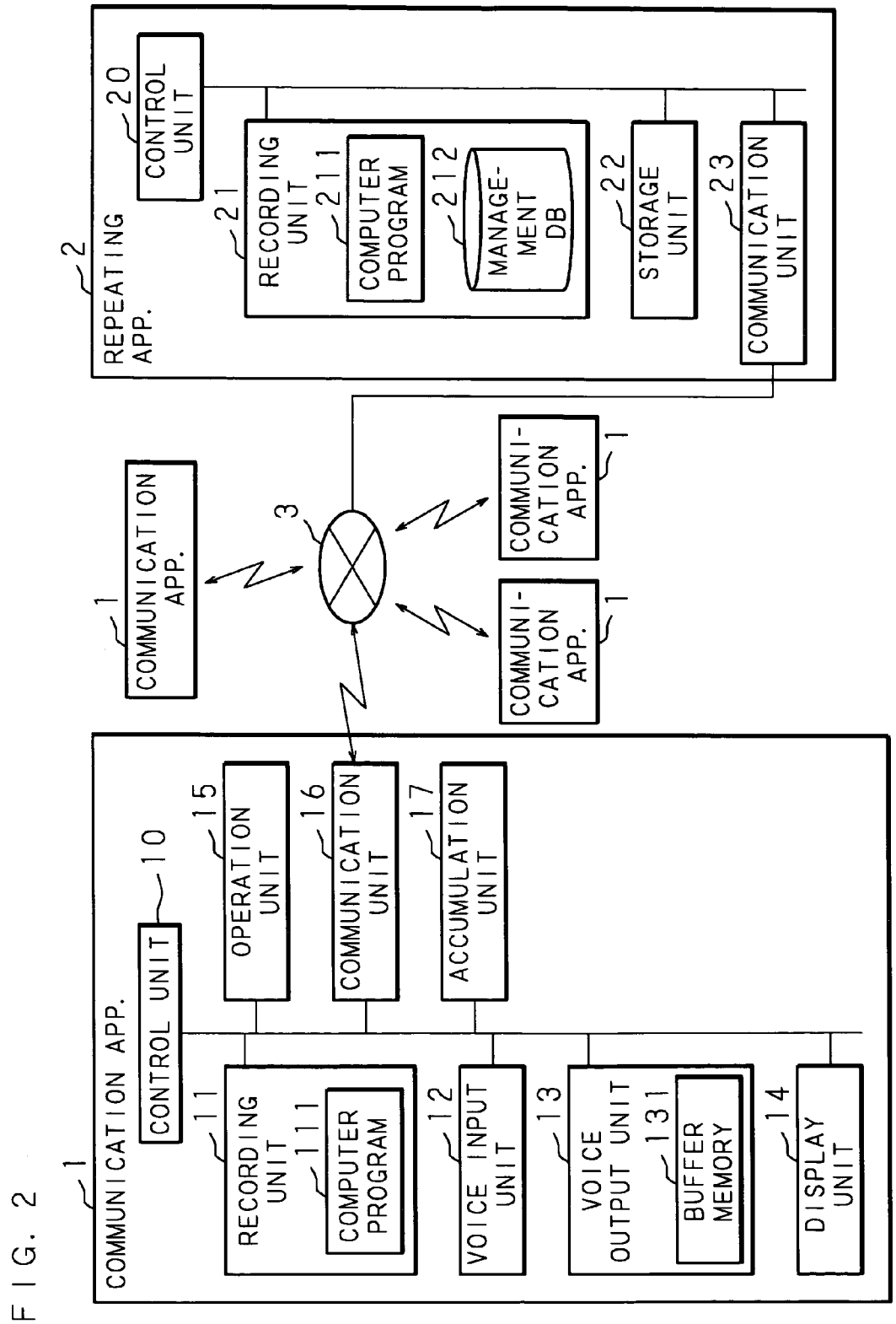
FIG. 2 is a block diagram showing an example of the configuration of each apparatus employed in a communication system according to Embodiment 1 of the present invention.

FIG. 2 is a block diagram showing an example of the configuration of each apparatus employed in the communication system according to Embodiment 1 of the present invention.

The communication apparatus 1 is provided with hardware including: a control unit 10 for controlling the entire apparatus; a recording unit 11 composed of volatile and nonvolatile memories for recording various kinds of information such as a computer program 111 for the communication apparatus of the present invention and data; a voice input unit 12 composed of a microphone or the like for accepting voice input; a voice output unit 13 composed of a speaker or the like for outputting voice; a display unit 14 composed of a liquid crystal display panel or the like for displaying an image; an operation unit 15 provided with various push buttons and the like; a communication unit 16 connected to the communication network 3; and an accumulation unit 17 used as a communication buffer. Then, the computer for communication executes each procedure included in the computer program 111 for the communication apparatus of the present invention under the control of the control unit 10, and thereby operates as the communication apparatus 1 of the present invention.

Further, under the control of the control unit 10, the communication apparatus 1 performs the following processing. The communication apparatus 1 converts into digital data the voice accepted of input as analog data through the voice input unit 12, then divides the voice data of the form of digital data into packets having a predetermined data length, and then transmits the packets from the communication unit 16. Alternatively, the communication apparatus 1 receives a packet containing voice data through the communication unit 16, then accumulates the voice data contained in the received packet into the accumulation unit 17, and then outputs the accumulated voice data to the voice output unit 13. The voice output unit 13 is composed of an audio chip and provided with a buffer memory 131. The voice output unit 13 accumulates the received voice data into the buffer memory 131, then converts the accumulated voice data into analog data, and then outputs as voice the voice data converted into analog data, at every predetermined time interval set up as an output interval. As the operation unit 15 provided in the communication apparatus 1, various kinds of push buttons such as numeric keys, symbol keys, and various function keys are included. As one function key, a PoC dedicated key used for requesting transmission right is included.

The repeating apparatus 2 as a PoC server computer is provided with hardware including: a control unit 20; a recording unit 21 composed of a hard disk or the like for recording various kinds of information such as a computer program 211 for the repeating apparatus of the present invention, and data; a storage unit 22 composed of a RAM or the like; and a communication unit 23. Then, the PoC server computer stores in the storage unit 22 the computer program 211 for the repeating apparatus of the present invention recorded in the recording unit 21. As a result, under the control of the control unit 20, the PoC server computer executes each procedure included in the computer program 211, and thereby operates as the repeating apparatus 2 of the present invention.

Further, the repeating apparatus 2 executes management concerning the PoC service such as the management of a plurality of grouped communication apparatuses 1, 1, . . . that perform telephone call on the basis of the PoC service and the management of a communication apparatus 1 having acquired transmission right within the group. Specifically, the repeating apparatus 2 performs the processing of causing to acquire (grant) transmission right in response to an acquisition request for transmission right provided from one communication apparatus 1, and further performs the processing of causing to release transmission right in response to a release request for transmission right provided from the one communication apparatus 1. A part of recording area in the recording unit 21 of the repeating apparatus 2 is utilized as a management data base (management DB) 212 used for the management concerning the PoC service such as grouping and transmission right assignment. The management database 212 manages each communication apparatus 1 on the basis of identification information such as a predetermined ID, the IP address, and the telephone number. The predetermined ID is an ID which can be set up arbitrarily by the user of each communication apparatus 1. For example, a user name such as "sato" and "tanaka" is used as the ID. Further, as the ID of the repeating apparatus 2, an ID such as "poc_controller" is used.

Figure 3:
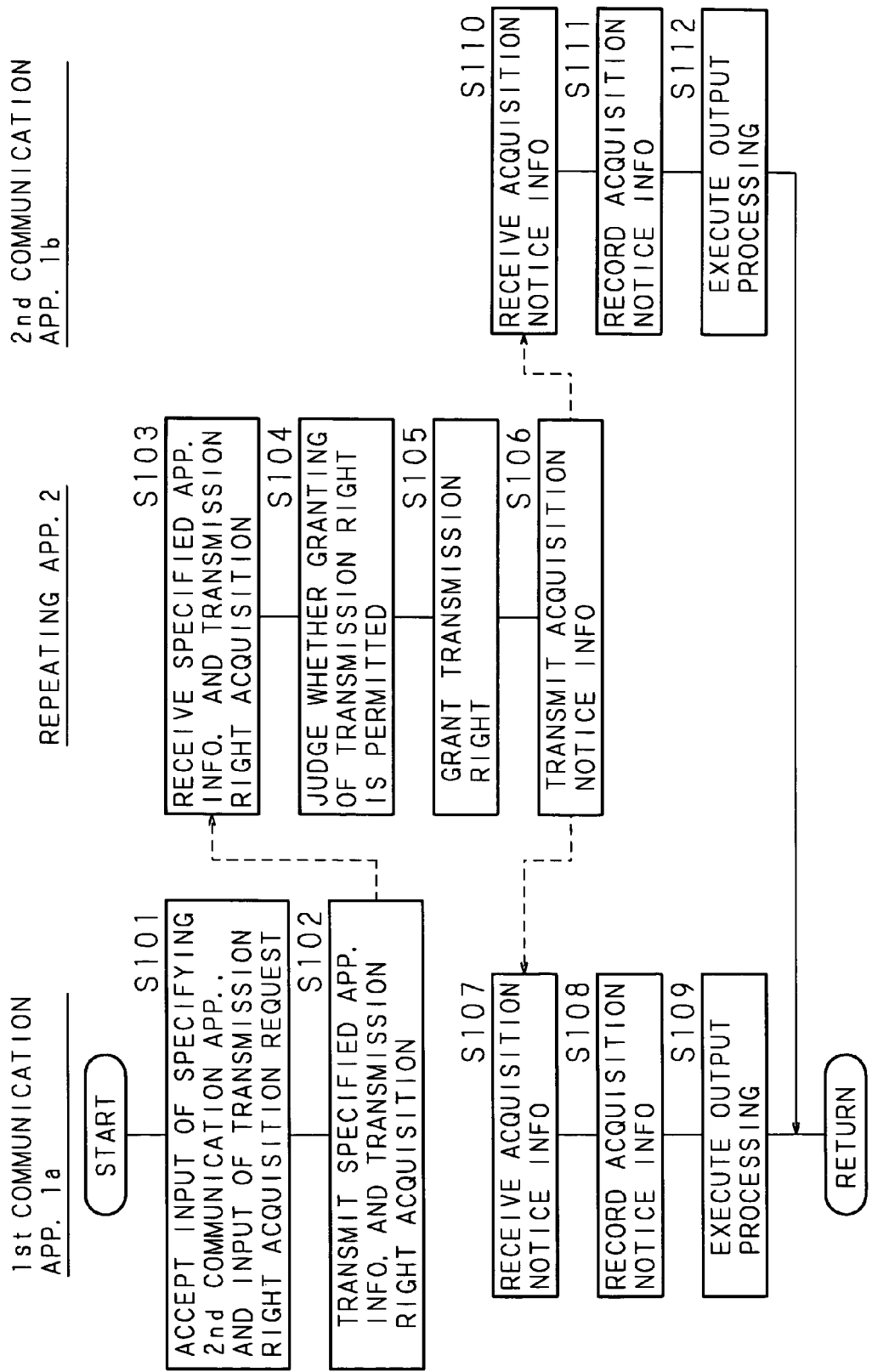
FIG. 3 is a flow chart showing an example of a procedure of transmission right acquisition processing performed by a communication apparatus and a repeating apparatus according to Embodiment 1 of the present invention.

Processing executed by each apparatus according to Embodiment 1 of the present invention is described below. For the convenience in the following description, when discrimination is necessary, a communication apparatus 1 going to acquire transmission right is referred to as a first communication apparatus 1a, while each communication apparatus 1 other than the first communication apparatus 1a is referred to as a second communication apparatus 1b. FIG. 3 is a flow chart showing an example of a procedure of transmission right acquisition processing performed by the communication apparatus 1 and the repeating apparatus 2 according to Embodiment 1 of the present invention. Here, the communication apparatus 1 and the repeating apparatus 2 are controlled by the control units 10 and 20 executing the computer programs 111 and 211 respectively, and thereby execute the following processing.

When desiring to make a speech by specifying a second communication apparatus 1b as a main target of speech among a plurality of the other second communication apparatuses 1b, the user who operates the first communication apparatus 1a performs input of specifying a second communication apparatus 1b as a main target of output as well as input of requesting the acquisition of transmission right.

Figure 4:
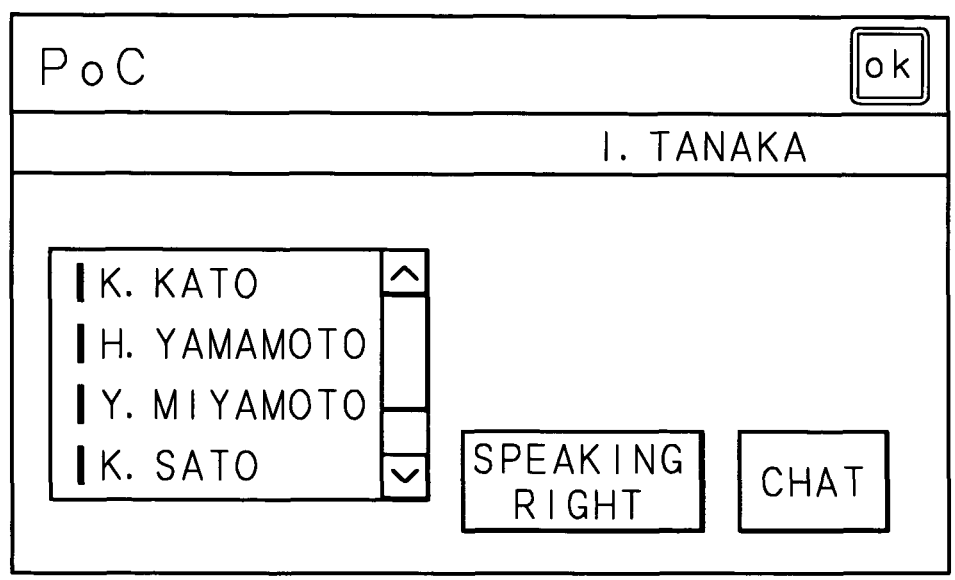
FIG. 4 is a schematic diagram showing an example of a screen outputted from display unit of a communication apparatus according to Embodiment 1 of the present invention.

FIG. 4 is a schematic diagram showing an example of a screen outputted from the display unit 14 of the communication apparatus 1 according to Embodiment 1 of the present invention. Specifically, FIG. 4 shows a screen displayed on the display unit 14 provided in the first communication apparatus 1a when, by using the first communication apparatus 1a, the specifying of a second communication apparatus 1b and the acquisition of transmission right are performed.

As shown in FIG. 4, an image showing the characters "OK" indicating the communication status are displayed in the upper right area of the screen, while the name of a user who operates this first communication apparatus 1a is displayed under the communication status. Further, in the left-hand area of the screen, a list of second communication apparatuses 1b grouped into the same group for the purpose of utilizing the PoC service is displayed in the form of a list of the names of the users of the respective apparatuses. Further, in the right-hand area of the screen, an image is displayed that has the appearance of a push button provided with the characters "speaking right" (corresponding to "transmission right"). When the user who operates the first communication apparatus 1a performs input of specifying a second communication apparatus 1b (a user name) as a main target of output as well as input of indicating the image displayed as "speaking right", the operation of specifying the second communication apparatus 1b and the operation of requesting the acquisition of transmission right (speaking right) are actually performed. Here, the operation of specifying a second communication apparatus 1b may invoke also the operation of requesting the acquisition of transmission right. Further, a plurality of second communication apparatuses 1b may be specified.

As shown in the flow chart of FIG. 3, the first communication apparatus 1a accepts, through the operation unit 15, input of specifying a second communication apparatus 1b as a main target of output, and input of requesting the acquisition of transmission right (S101), and then transmits specified apparatus information for specifying the specified second communication apparatus 1b as well as a transmission right acquisition request from the communication unit 16 to the repeating apparatus 2 via the communication network 3 (S102). The specified apparatus information and the transmission right acquisition request transmitted at step S102 are generated, for example, in the form of a command described below. The command described below is a transmission right acquisition request transmitted from a first communication apparatus 1a whose ID is "tanaka" to the repeating apparatus 2 whose ID is "poc_controller". This command contains also specified apparatus information specifying a second communication apparatus 1b whose ID is "sato".

REQUEST_FLOOR
To: poc_controller
From: tanaka
TalkTo: sato
Message-ID: 0001

The repeating apparatus 2 receives, through the communication unit 23, the specified apparatus information and the transmission right acquisition request (S103), and then judges the permission or non-permission of granting transmission right to the first communication apparatus 1a (S104). The judgment of permission or non-permission of granting transmission right at step S104 is determined on the basis of the situation whether transmission right has already been granted to another communication apparatus 1 and whether a transmission right acquisition request has already been received from another communication apparatus 1.

When it is judged that granting of transmission right is permitted, the repeating apparatus 2 grants, to the first communication apparatus 1a, transmission right specifying the second communication apparatus 1b specified by the specified apparatus information (S105). The processing of granting transmission right performed at step S105 includes: that a flag indicating the fact of having acquired transmission right is recorded in a manner corresponding to the first communication apparatus 1a having acquired transmission right among a plurality of the grouped communication apparatuses 1 recorded in the management data base 212; and that a flag indicating the fact of being specified is recorded in a manner corresponding to the specified second communication apparatus 1b. Here, when it is judged that granting of transmission right is not permitted, abnormal processing is performed for notifying the first communication apparatus 1a that the acquisition of transmission right has been unsuccessful.

Then, the repeating apparatus 2 performs multi-address calling of acquisition notice information for notifying that the acquisition of transmission right has been successful, from the communication unit 23 to all the communication apparatuses 1 including the first communication apparatus 1a, via the communication network 3 (S106). At step S106, the repeating apparatus 2 can notify the fact that the first communication apparatus 1a has acquired transmission right specifying a specific second communication apparatus 1b, not only to the first communication apparatus 1a but also to all the other second communication apparatuses 1b. The acquisition notice information transmitted at step S106 is generated, for example, in the form of a command described below. The command described below is an acquisition notice information for notifying that transmission right has been acquired in correspondence to the specified apparatus information and the transmission right acquisition request illustrated in the description of step S102. This command is transmitted from the repeating apparatus 2 whose ID is "poc_controller" to the communication apparatus 1a whose ID is "tanaka".

FLOOR_GRANTED
To: tanaka
From: poc_controller
Message-ID: 0001

The first communication apparatus 1a receives, through the communication unit 16, the acquisition notice information (S107), then records the received acquisition notice information into the recording unit 11 (S108), and then executes output processing from the voice output unit 13 and the display unit 14 on the basis of the recorded acquisition notice information (S109). The output based on the acquisition notice information is, for example, the processing of outputting a predetermined sound, a predetermined image, or the like indicating that transmission right has been acquired.

Similar processing is performed by each second communication apparatus 1b other than the first communication apparatus 1a. The second communication apparatus 1b receives, through the communication unit 16, the acquisition notice information (S110), then records the received acquisition notice information into the recording unit 11 (S111), and then executes output processing from the voice output unit 13 and the display unit 14 on the basis of the recorded acquisition notice information (S112). At step S112, the second communication apparatus 1b specified as a main target of output performs output based on the acquisition notice information, that is, output indicating the fact that the first communication apparatus 1a has acquired transmission right specifying this specific second communication apparatus 1b. On the other hand, each second communication apparatus 1b not specified as a main target of output performs output indicating the fact that the first communication apparatus 1a has acquired transmission right specifying another specific second communication apparatus 1b. As such, transmission right acquisition processing is executed.

FIG. 5 is a flow chart showing an example of a procedure of apparatus-specified call processing performed by the communication apparatus 1 and the repeating apparatus 2 according to Embodiment 1 of the present invention. Here, the communication apparatus 1 and the repeating apparatus 2 are controlled by the control units 10 and 20 executing the computer programs 111 and 211 respectively, and thereby execute the following processing.

The first communication apparatus 1a having acquired transmission right by the transmission right acquisition processing starts transmission of voice such as a speech of the user. The first communication apparatus 1a accepts input of voice through the voice input unit 12 (S201), and then transmits the accepted voice in the form of packeted voice data from the communication unit 16 to the repeating apparatus 2 via the communication network 3 (S202).

The repeating apparatus 2 receives the voice data through the communication unit 23 (S203), and then performs multi-address calling of the received voice data from the communication unit 23 to the grouped second communication apparatuses 1b (S204).

When receiving the voice data through the communication unit 16 (S205), the second communication apparatus 1b judges whether the apparatus itself has been specified as a main target of output, on the basis of the acquisition notice information recorded in the recording unit 11 (S206).

At step S206, when it is judged that the apparatus itself has been specified (S206: YES), the second communication apparatus 1b executes output processing indicating of receiving the voice data in which the apparatus itself has been specified as a main target of output, through the voice output unit 13 and the display unit 14 (S207), and then retains the received voice data into the recording unit 11 (S208). Further, the second communication apparatus 1b executes voice output processing through the voice output unit 13 on the basis of the received voice data (S209). The output processing at step S207 for indicating that the apparatus itself has been specified is executed by outputting voice and/or an image.

At step S206, when it is judged that the apparatus itself is not specified (S206: NO), the second communication apparatus 1b executes output processing indicating of receiving the voice data (S210), and then executes voice output processing through the voice output unit 13 on the basis of the received voice data (S211).

The output processing for indicating the fact of being specified performed at step S207 by a specified second communication apparatus 1b differs from the output processing performed at step S210 by a not-specified second communication apparatus 1b. For example, the not-specified second communication apparatus 1b outputs a single sound "pip" at step S210, while the specified second communication apparatus 1b outputs successive sounds "pip, pip, pip" at step S207. Further, the specified second communication apparatus 1b outputs an image differ from that of the not-specified second communication apparatus 1b.

Figure 6A:
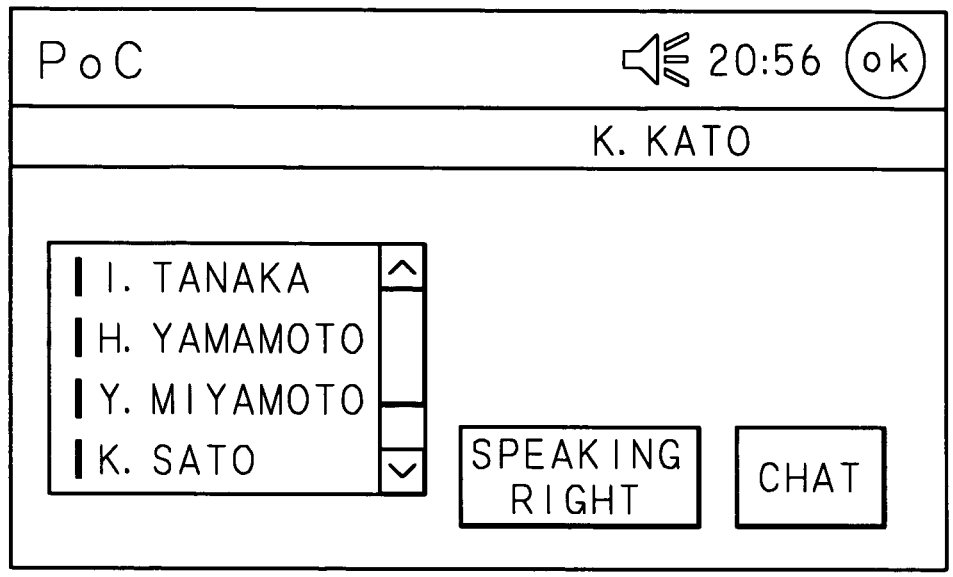
FIG. 6A and FIG. 6B are schematic diagrams each showing an example of a screen outputted from display unit of a communication apparatus according to Embodiment 1 of the present invention.
Figure 6B:
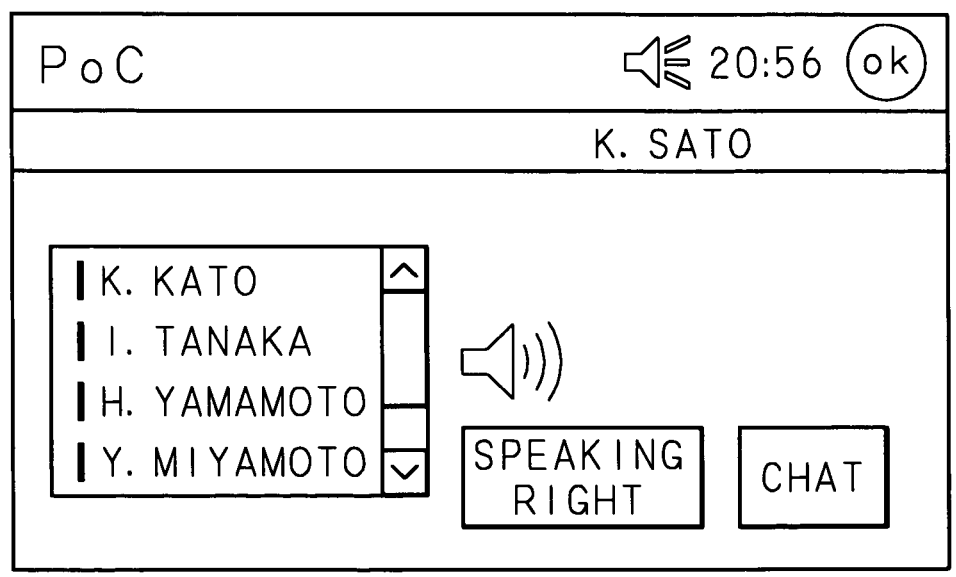

FIG. 6A and FIG. 6B are schematic diagrams each showing an example of a screen outputted from the display unit 14 of the communication apparatus 1 according to Embodiment 1 of the present invention. Specifically, each of FIG. 6A and FIG. 6B shows an example of a screen outputted from the display unit 14 when the second communication apparatus 1b receives the voice data. More specifically, FIG. 6A shows a screen outputted from the second communication apparatus 1b not specified as a main target of output. Further, FIG. 6B shows a screen outputted from the second communication apparatus 1b specified as a main target of output.

As seen from the comparison between FIG. 6A and FIG. 6B, in the specified second communication apparatus 1b, an image whose appearance imitates a speaker blinks. Thus, by means of visual recognition of the image displayed at the time of reception of the voice data, each user can judge whether the user's communication apparatus 1 is specified. Here, the way of indicating the fact of being specified may be modified in various manners. For example, the color may be changed in the entire screen of the second communication apparatus 1b.

At step S208, the second communication apparatus 1b retains the received voice data corresponding to the identification information of the first communication apparatus 1a as the transmission source.

The voice based on the voice data outputted in the processing at step S209 from the second communication apparatus 1b specified as a main target of output is outputted at a higher sound volume than the voice based on the voice data outputted in the processing at step S211 from the not-specified second communication apparatus 1b. However, the sound volume which is set up in the voice output unit 12 of the second communication apparatus 1b may be increased so that the voice may be outputted at yet higher levels (Note that, at the same time, the sound volume outputted from the not-specified second communication apparatus 1b may be lowered). Alternatively, a sound or voice that attracts the user's attention may be outputted like an alarm sound, a melody sound, and a voice message "inquiry from Mr. XX is received", and after that the voice output processing may be performed on the basis of the received voice data. Further, these kinds of processing may be performed in combination. As such, apparatus-specified call processing is executed.

Figure 7:
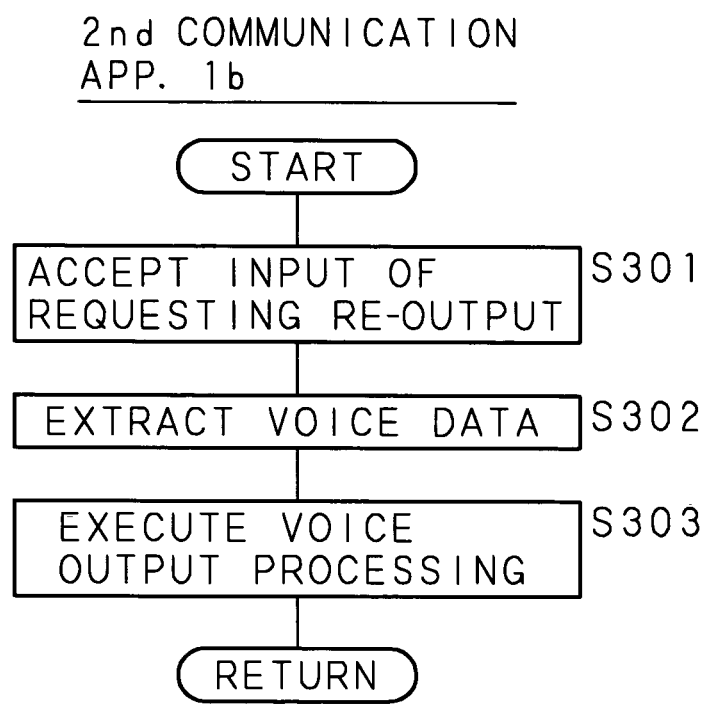
FIG. 7 is a flow chart showing an example of a procedure of re-output processing performed by a communication apparatus according to Embodiment 1 of the present invention.

FIG. 7 is a flow chart showing an example of a procedure of re-output processing performed by the communication apparatus 1 according to Embodiment 1 of the present invention.

Here, the communication apparatus 1 is controlled by the control unit 10 executing the computer program 111, and thereby executes the following processing.

When the user who operates the second communication apparatus 1b specified in the above-mentioned apparatus-specified call processing and then having received the voice data performs a predetermined operation of requesting voice re-output, the second communication apparatus 1b starts re-output processing. The second communication apparatus 1b accepts the input of requesting re-output through the operation unit 15 (S301), then extracts the voice data retained in the recording unit 11 (S302), and then executes output processing on the basis of the output data through the voice output unit 13 (S303). Here, when a plurality of voice data are recorded in the recording unit 11, the user can select a desired voice data at the time of inputting a re-output request. As such, re-output processing is executed.

Figure 8:
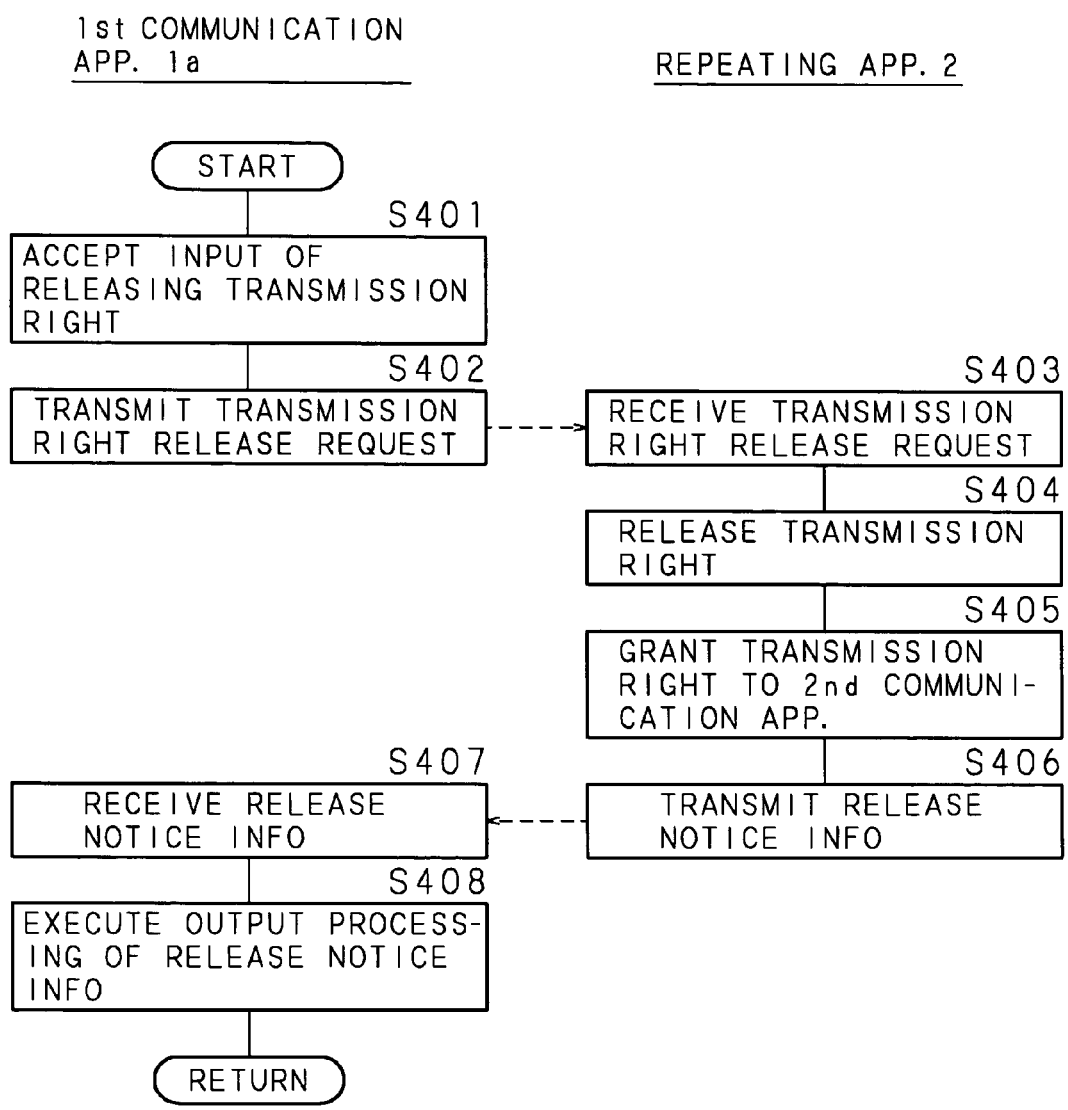
FIG. 8 is a flow chart showing an example of a procedure of transmission right release processing performed by a communication apparatus and a repeating apparatus according to Embodiment 1 of the present invention.

FIG. 8 is a flow chart showing an example of a procedure of transmission right release processing performed by the communication apparatus 1 and the repeating apparatus 2 according to Embodiment 1 of the present invention. Here, the communication apparatus 1 and the repeating apparatus 2 are controlled by the control units 10 and 20 executing the computer programs 111 and 211 respectively, and thereby execute the following processing.

When desiring the release of transmission right, the user who operates the first communication apparatus 1a performs the operation of releasing transmission right. The first communication apparatus 1a accepts the input of releasing transmission right through the operation unit 15 (S401), and then transmits a transmission right release request for requesting the release of transmission right from the communication unit 16 to the repeating apparatus 2 via the communication network 3 (S402). The transmission right release request transmitted at step S402 is generated, for example, in the form of a command described below. The command described below is a transmission right release request transmitted from the first communication apparatus 1a whose ID is "tanaka" to the repeating apparatus 2 whose ID is "poc_controller".

RELEASE_FLOOR
From: tanaka
To: poc_controller
Message-ID: 0003

The repeating apparatus 2 receives the transmission right release request through the communication unit 23 (S403), and then releases the transmission right having been granted to the first communication apparatus 1a on the basis of the received retransmission request (S404). The processing of releasing transmission right performed at step S404 includes: that a flag indicating the fact of having acquired transmission right is deleted that has been recorded corresponding to the first communication apparatus 1a having acquired transmission right among a plurality of the grouped communication apparatuses 1 recorded in the management data base 212; and that a flag indicating the fact of being specified is deleted that has been recorded corresponding to the specified second communication apparatus 1b.

Then, the repeating apparatus 2 grants transmission right specifying the first communication apparatus 1a as a main target of output, to the second communication apparatus 1b which had been specified as a main target of output by the first communication apparatus 1a (S405). That is, the first communication apparatus 1a that had acquired transmission right and the second communication apparatus 1b that had been specified are interchanged. Thus, the second communication apparatus 1b can rapidly reply to a call from the first communication apparatus 1a. Here, in place of the granting of transmission right to the specified second communication apparatus 1b, priority for transmission right acquisition may be granted. Specifically, after the first communication apparatus 1a releases transmission right, when the repeating apparatus 2 receives transmission right acquisition requests from a plurality of communication apparatuses 1, the repeating apparatus 2 grants transmission right to the communication apparatus 1 having been specified immediately before. Further, when a plurality of second communication apparatuses 1b are specified, transmission right may be granted to a second communication apparatus 1b that has transmitted at first the transmission right acquisition request.

Then, the repeating apparatus 2 transmits release notice information for notifying that the previous transmission right has been released and that transmission right has then been granted to the second communication apparatus 1b, from the communication unit 23 to the first communication apparatus 1a via the communication network 3 (S406). Further, the repeating apparatus 2 transmits release notice information for notifying that the transmission right of the first communication apparatus 1a has been released and that transmission right has then been granted to the second communication apparatus 1b, to all the other second communication apparatuses 1b. Here, the notice that the previous transmission right has been released need not be performed explicitly, while the notice that transmission right has newly been granted to the other communication apparatuses 1 may solely be performed. In this case, when the notice is received, the first communication apparatus 1a can recognize that the previous transmission right has been released.

The first communication apparatus 1a receives the release notice information through the communication unit 16 (S407), and then executes output processing from the voice output unit 13 and the display unit 14 on the basis of the received release notice information (S408). The output based on the release notice information is, for example, the processing of outputting a predetermined sound, a predetermined image, or the like indicating that transmission right has been released. As such, transmission right release processing is executed.

(Embodiment 2)

Embodiment 2 of the present invention shows a mode that in Embodiment 1, specifying of a communication apparatus as a main target of output is performed not at the time of transmission right acquisition processing but at the time of transmission of voice data after the acquisition of transmission right. The example of the configuration of the communication system and each apparatus according to Embodiment 2 is similar to that of Embodiment 1. Thus, Embodiment 1 should be referred to for their description. Hence, the description is omitted in the present embodiment. Further, in the following description, same components to Embodiment 1 are denoted by same reference numerals to Embodiment 1.

Figure 9:
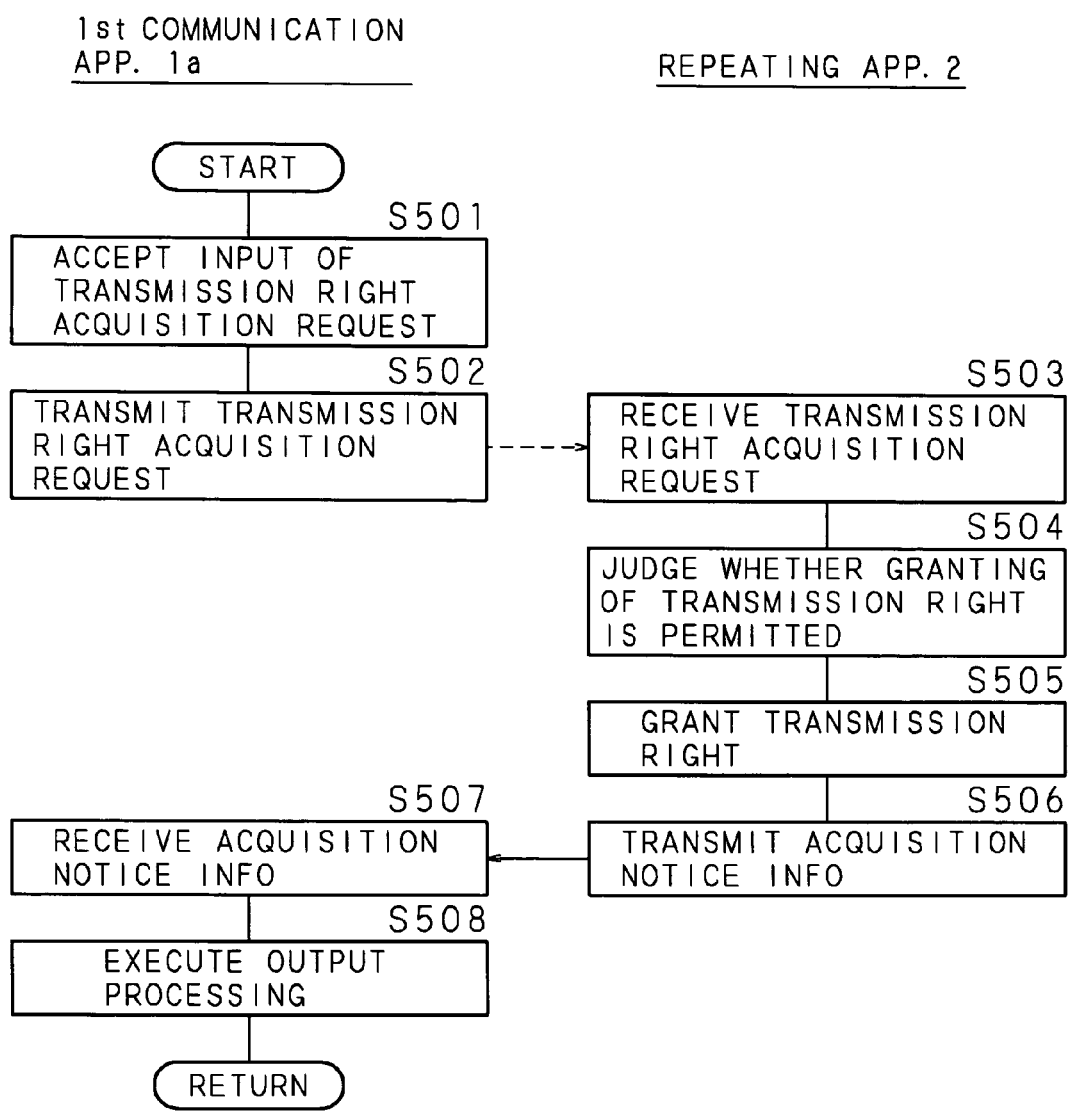
FIG. 9 is a flow chart showing an example of a procedure of transmission right acquisition processing performed by a communication apparatus and a repeating apparatus according to Embodiment 2 of the present invention.

Processing performed by each apparatus according to Embodiment 2 of the present invention is described below. FIG. 9 is a flow chart showing an example of a procedure of transmission right acquisition processing performed by the communication apparatus 1 and the repeating apparatus 2 according to Embodiment 1 of the present invention. Here, the communication apparatus 1 and the repeating apparatus 2 are controlled by the control units 10 and 20 executing the computer programs 111 and 211 respectively, and thereby execute the following processing.

The user who operates the first communication apparatus 1a performs input of requesting the acquisition of transmission right. The first communication apparatus 1a accepts the input of requesting the acquisition of transmission right through the operation unit 15 (S501), and then transmits a transmission right acquisition request on the basis of the accepted input from the communication unit 16 to the repeating apparatus 2 via the communication network 3 (S502).

The repeating apparatus 2 receives the transmission right acquisition request through the communication unit 23 (S503), and then judges the permission or non-permission of granting transmission right to the first communication apparatus 1a (S504).

When it is judged that granting of transmission right is permitted, the repeating apparatus 2 grants transmission right to the first communication apparatus 1a (S505), and then transmits acquisition notice information for notifying that the acquisition of transmission right has been successful, from the communication unit 23 to the first communication apparatus 1a via the communication network 3 (S506). Further, the repeating apparatus 2 notifies all the other second communication apparatuses 1b that the first communication apparatus 1a has acquired the transmission right. Here, when it is judged that granting of transmission right is not permitted, abnormal processing is performed for notifying the first communication apparatus 1a that the acquisition of transmission right has been unsuccessful.

The first communication apparatus 1a receives the acquisition notice information through the communication unit 16 (S507), and then executes output processing from the voice output unit 13 and the display unit 14 on the basis of the received acquisition notice information (S508). As such, transmission right acquisition processing is executed.

FIG. 10 is a flow chart showing an example of a procedure of apparatus-specified call processing performed by the communication apparatus 1 and the repeating apparatus 2 according to Embodiment 2 of the present invention. Here, the communication apparatus 1 and the repeating apparatus 2 are controlled by the control units 10 and 20 executing the computer programs 111 and 211 respectively, and thereby execute the following processing.

The user who operates the first communication apparatus 1a having acquired transmission right by the transmission right acquisition processing makes a speech after performing input of specifying a second communication apparatus 1b as a main target of output. The first communication apparatus 1a accepts through the operation unit 15 the input of specifying the second communication apparatus 1b as a main target of output (S601), and then accepts the input of voice through the voice input unit 12 (S602). Then, the first communication apparatus 1a transmits packeted voice data generated by packeting the accepted voice, from the communication unit 16 to the repeating apparatus 2 via the communication network 3 (S603). At step S603, in the packets of the voice data, specified apparatus information for specifying the specified second communication apparatus 1b is contained, for example, in the form of header information. However, at each time of changing the second communication apparatus 1b specified as a main target of output, notice information for notifying that the main target has been changed may be transmitted to each communication apparatus 1. In this case, the specified apparatus information need not be contained in the voice data. Thus, processing similar to Embodiment 1 can be performed. Here, the first communication apparatus 1a can specify a different second communication apparatus 1b at each time of transmitting voice data.

The repeating apparatus 2 receives the voice data containing the specified apparatus information through the communication unit 23 (S604), and then performs multi-address calling of the received voice data from the communication unit 23 to the grouped second communication apparatuses 1b (S605).

The second communication apparatus 1b receives the voice data through the communication unit 16 (S606), and then judges whether the apparatus itself is specified, on the basis of the header information of the packets of the received voice data (S607).

At step S607, when it is judged that the apparatus itself is specified (S607: YES), the second communication apparatus 1b executes output processing indicating the fact of being specified as a main target of output from the voice output unit 13 and the display unit 14 (S608), and then retains the received voice data into the recording unit 11 (S609). Further, the second communication apparatus 1b executes voice output processing from the voice output unit 13 on the basis of the received voice data (S610).

At step S607, when it is judged that the apparatus itself is not specified (S607: NO), the second communication apparatus 1b executes output processing indicating that the voice data has been received (S611), and then executes voice output processing from the voice output unit 13 on the basis of the received voice data (S612). As such, apparatus-specified call processing is executed.

In Embodiment 2, the other points concerning configuration and processing are similar to those of Embodiment 1. Thus, Embodiment 1 should be referred to for their description. Hence, the description is omitted in the present embodiment.

Embodiment 2 has been described above for the case that specifying of a second communication apparatus 1b as a main target of output is received after the acquisition of transmission right, and that the specified communication apparatus information indicating the specified communication apparatus is included into the header information at each time of transmission of the voice data. However, the present invention is not limited to this. That is, various modifications may be implemented as described below.

For example, at the time of specifying or changing of the communication apparatus, the information may be set up solely in the voice data transmitted immediately after that. In this mode, when receiving the voice data, the communication apparatus checks whether any information concerning the communication apparatus as a main target of output is included in the received voice data. When information concerning the communication apparatus as a main target of output is included, the communication apparatus judges whether the apparatus itself is specified. When it is judged that the apparatus itself is specified, the communication apparatus performs output indicating that the apparatus itself is specified.

Further, for example, in the communication apparatus, a flag area indicating whether the apparatus itself is specified is provided in the recording unit, so that information indicating that the apparatus itself is specified is set up in this flag area. After that, when information concerning the communication apparatus as a main target of output is not included in the voice data, the communication apparatus refers to the flag area. Then, when information indicating that the apparatus itself is specified is set up in the flag area, the communication apparatus performs output indicating that the apparatus itself is specified. On the other hand, when information indicating that the apparatus itself is specified is not set up in the flag area, the communication apparatus performs ordinary output processing.

Further, in the case that specified communication apparatus information indicating a communication apparatus as a main target of output is contained in the received voice data and that the communication apparatus specified as a main target of output is not the apparatus itself, the communication apparatus refers to the flag area. Then, when information indicating that the apparatus itself is specified is set up in the flag area, the communication apparatus cancels the setting of the flag area, and then performs output processing indicating that the specifying of the apparatus itself has been canceled.

Further, for example, when a communication apparatus receives information for specifying a communication apparatus as a main target of output, the information may be transmitted not in the form of being included in the voice data but in the form of control data transmitted separately. In this mode, when receiving the specifying of a communication apparatus as a main target of output, the communication apparatus or the repeating apparatus generates control data containing information for specifying the communication apparatus as a main target of output, and then distributes the data to each communication apparatus. When receiving the control data containing the information for specifying the communication apparatus as a main target of output, each communication apparatus judge whether the communication apparatus specified by the information contained in the control data is the apparatus itself. Then, when it is judged that the apparatus itself is specified, the communication apparatus, for example, sets up information indicating that the apparatus itself is specified, into the flag area provided in the recording unit. When it is judged that the apparatus itself is not specified, the communication apparatus refers to the flag area. Then, when information indicating that the apparatus itself is specified is set up, the communication apparatus cancels the setting. When voice data is received, the communication apparatus refers to the flag area, and thereby judges whether information indicating that the apparatus itself is specified is set up. Then, when information indicating that the apparatus itself is specified is set up, the communication apparatus performs output processing indicating that the apparatus itself is specified. When information indicating that the apparatus itself is specified is not set up, the communication apparatus performs ordinary output processing.

(Embodiment 3)

Embodiment 3 of the present invention shows a mode that the voice data is retained in the repeating apparatus in Embodiment 1. The example of the configuration of the communication system and each apparatus according to Embodiment 3 is similar to that of Embodiment 1. Thus, Embodiment 1 should be referred to for their description. Hence, the description is omitted in the present embodiment. Further, in the following description, same components to Embodiment 1 are denoted by same reference numerals to Embodiment 1.

Figure 11:
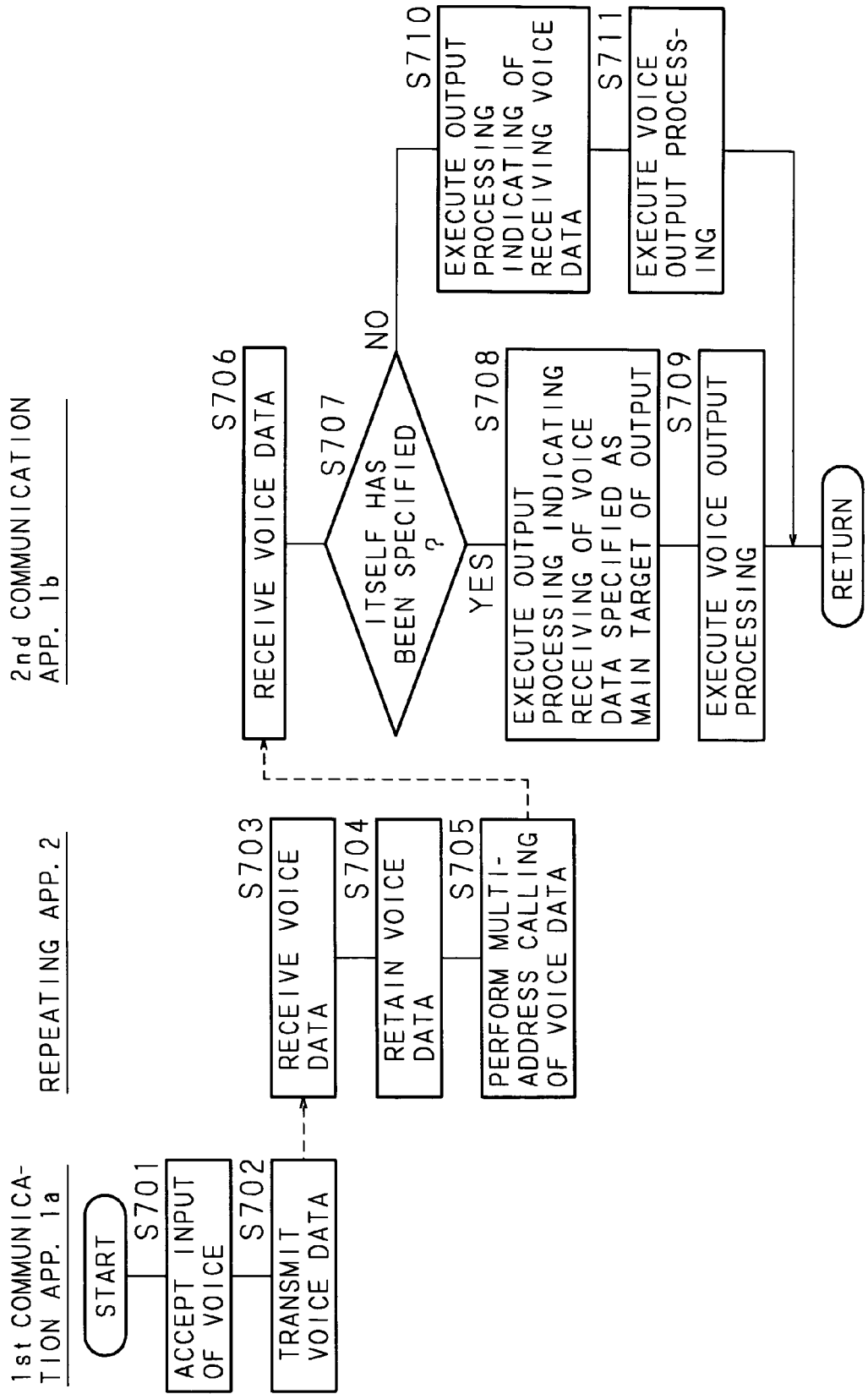
FIG. 11 is a flow chart showing an example of a procedure of apparatus-specified call processing performed by a communication apparatus and a repeating apparatus according to Embodiment 3 of the present invention.

Processing performed by each apparatus according to Embodiment 3 of the present invention is described below. The transmission right acquisition processing in Embodiment 3 is similar to that of Embodiment 1. Thus, Embodiment 1 should be referred to for its description. Hence, the description is omitted in the present embodiment. FIG. 11 is a flow chart showing an example of a procedure of apparatus-specified call processing performed by the communication apparatus 1 and the repeating apparatus 2 according to Embodiment 3 of the present invention. Here, the communication apparatus 1 and the repeating apparatus 2 are controlled by the control units 10 and 20 executing the computer programs 111 and 211 respectively, and thereby execute the following processing.

The first communication apparatus 1*a* having acquired transmission right by the transmission right acquisition processing starts transmission of voice such as a speech of the user. The first communication apparatus 1*a* accepts input of voice through the voice input unit 12 (S701), and then transmits packeted voice data generated by packeting the accepted voice, from the communication unit 16 to the repeating apparatus 2 via the communication network 3 (S702).

The repeating apparatus 2 receives the voice data through the communication unit 23 (S703), and then retains into the recording unit 21 the received voice data corresponding to the identification information of the first communication apparatus 1*a* as the transmission source and the identification information of the specified second communication apparatus 1*b*, as well as performs multi-address calling of the received voice data to the other grouped communication apparatuses from the communication unit 23 (S704 and S705).

The second communication apparatus 1*b* receives the voice data through the communication unit 16 (S706), and then judges whether the apparatus itself is specified, on the basis of the header information of the packets of the received voice data (S707).

At step S707, when it is judged that the apparatus itself is specified (S707: YES), the second communication apparatus 1*b* executes output processing indicating the fact of being specified as a main target of output from the voice output unit 13 and the display unit 14 (S708), and then executes voice output processing from the voice output unit 13 on the basis of the received voice data (S709).

At step S707, when it is judged that the apparatus itself is not specified (S707: NO), the second communication apparatus 1*b* executes output processing indicating that the voice data has been received (S710), and then executes voice output processing from the voice output unit 13 on the basis of the received voice data (S711). As such, apparatus-specified call processing is executed.

Figure 12:
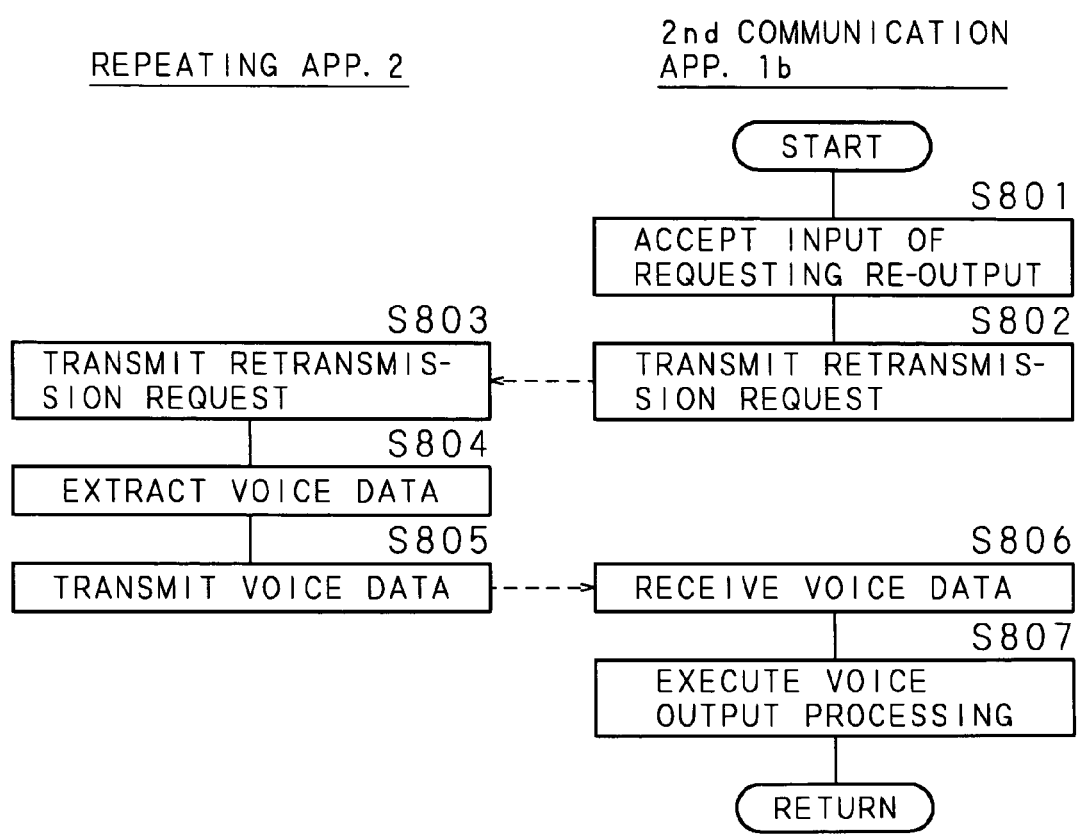
FIG. 12 is a flow chart showing an example of a procedure of re-output processing performed by a communication apparatus and a repeating apparatus according to Embodiment 3 of the present invention.

FIG. 12 is a flow chart showing an example of a procedure of re-output processing performed by the communication apparatus 1 and the repeating apparatus 2 according to Embodiment 3 of the present invention. Here, the communication apparatus 1 and the repeating apparatus 2 are controlled by the control units 10 and 20 executing the computer programs 111 and 211 respectively, and thereby execute the following processing.

When the user who operates the second communication apparatus 1*b* specified by the apparatus-specified call processing and then having received the voice data performs a predetermined operation of requesting voice re-output, the second communication apparatus 1*b* starts re-output processing. The second communication apparatus 1*b* accepts input of requesting re-output through the operation unit 15 (S801), and then transmits a retransmission request for requesting retransmission of the voice data, from the communication unit 16 to the repeating apparatus 2 via the communication network 3 (S802).

The repeating apparatus 2 receives the retransmission request through the communication unit 23 (S803), and then extracts, on the basis of the received retransmission request, the voice data retained in the recording unit 21 corresponding to the identification information indicating the second communication apparatus 1*b* as the transmission source of the retransmission request (S804). Then, the repeating apparatus 2 transmits the extracted voice data from the communication unit 23 to the second communication apparatus 1*b* via the communication network 3 (S805).

The second communication apparatus 1*b* receives the voice data through the communication unit 16 (S806), and then executes voice output processing on the basis of the received voice data (S807). As such, re-output processing is executed.

In Embodiment 3, the other points concerning configuration and processing are similar to those of Embodiment 1. Thus, Embodiment 1 should be referred to for their description. Hence, the description is omitted in the present embodiment. Here, Embodiment 3 has been described for the case that the voice data is retained in the repeating apparatus 2 in Embodiment 1. Alternatively, the voice data may be retained in the repeating apparatus 2 in Embodiment 2. As such, various modifications may be implemented in appropriate combinations.

Embodiments 1 through 3 have been described above for the case that an IP telephone terminal device having a transceiver function is employed as each communication apparatus. However, the present invention is not limited to this. That is, for example, a computer of any type may be employed as the communication apparatus, as long as the computer can be connected to a communication network and is capable of inputting and outputting voice. Thus, all or part of the grouped communication apparatuses may be realized by such computers like personal computers. Further, the present invention may be applied to an electronic conferencing system.

Further, Embodiments 1 through 3 have been described above for the case that voice data based on voice is transmitted and received while voice is outputted on the basis of the voice data. However, the present invention is not limited to this. That is, the output data may be that used for performing output other than voice. For example, image data based on an image may be transmitted and received while an image may be outputted on the basis of the image data.

Further, Embodiments 1 through 3 have been described above for the case that specifying of a communication apparatus as a main target of output is performed when the user of a communication apparatus inputs information for specifying a communication apparatus. However, the present invention is not limited to this. That is, various modifications may be implemented as described below.

In the present invention, for example, a database may be prepared in advance that records identification information specifying each communication apparatus and position information indicating the position of each communication apparatus corresponding to each other. Then, when position information is specified, identification information corresponding to the specified position information or alternatively corresponding to position information nearest to the specified position information may be extracted from the database, so that the communication apparatus indicated by the extracted identification information may be adopted as a communication apparatus as a main target of output. According to this configuration, for example, when a plurality of workers perform inspection work for machines installed at distant places, the other workers staying at each work place need not be checked, while when each place is merely specified sequentially, the situation can be inquired for the workers staying at each work place. This permits efficient checking of the situation of each work place.

In the present invention, for example, a database may be prepared in advance that records identification information specifying each communication apparatus and attribute information describing an attribute of the user of each communication apparatus corresponding to each other. Then, when attribute information is specified, identification information recorded in correspondence to the specified attribute information may be from the database, so that the communication apparatus indicated by the extracted identification information may be adopted as a communication apparatus as a main target of output. In this case, attribute information describing the attribute of the user of each communication apparatus may be static information such as the name, the sex, the address, the company name, and the affiliation, or alternatively may be dynamically varying apparatus-environmental information such as the location, the personal computer, the Internet parameters of the user. According to this configuration, for example, in a meeting, the pros or cons to the subject of discussion may be inquired and recorded as the attribute information. Then, with specifying pros as the attribute, opinions of the proponents may be listened to in order. After that, with specifying cons as the attribute, opinions of the opponents may be listened to in order. This improves efficiently.

Further, in Embodiments 1 through 3 described above, when transmission right acquisition requests are received simultaneously from a plurality of communication apparatuses or alternatively when a plurality of identification information each of which satisfies a predetermined condition and specifies a communication apparatus are extracted from the database as described above, the repeating apparatus may grant, with priority, transmission right to the communication apparatus having been specified immediately before. At the same time, the repeating apparatus may determine the order of granting transmission right to the other communication apparatuses, and then grant transmission right sequentially on the basis of the determined order.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds there-of are therefore intended to be embraced by the claims.

The invention claimed is:

1. A data communication method for grouping a plurality of communication apparatuses and for performing data communicating among the grouped plurality of communication apparatuses, comprising:

accepting a request of acquiring transmission right from any communication apparatus among the plurality of communication apparatuses;

by said communication apparatus going to acquire the transmission right, accepting input specifying, as a main target of data being output from said communication apparatus going to acquire the transmission right, at least one other communication apparatus among the communication apparatuses;

sending the data being output from said communication apparatus that acquired the transmission right toward said at least one other communication apparatus, in a multi-address calling manner;

executing judgment processing to determine whether received data is specified for said at least one other communication apparatus, on said at least one other communication apparatus receiving the data sent in the multi-address calling manner;

executing, on said at least one other communication apparatus, data output processing of the received data, when said at least one other communication apparatus has judged negative; and executing, on said at least one other communication apparatus, not only the data output processing but also specification output processing indicating a fact of being specified when said at least one other communication apparatus has judged positive.

2. A communication system in which a plurality of communication apparatuses are grouped and communicating data among the grouped plurality of communication apparatuses, comprising:

accepting means for accepting a request of acquiring transmission right from any communication apparatus among the plurality of communication apparatuses, wherein said communication apparatus going to acquire the transmission right comprises:

specifying means for accepting input specifying, as a main target of data being output from said communication apparatus going to acquire the transmission right, at least one other communication apparatus among the communication apparatuses, and means for sending the data being output from said communication apparatus that acquired the transmission right toward said at least one other communication apparatus, in a multi-address calling manner;

means for executing judgment processing to determine whether received data is specified for said at least one other communication apparatus, on said at least one other communication apparatus receiving the data sent in the multi-address calling manner;

means for executing, on said at least one other communication apparatus, data output processing of the received data, when said at least one other communication apparatus has judged negative; and means for executing, on said at least one other communication apparatus, the data output processing and specification output processing indicating a fact of being specified, when said at least one other communication apparatus has judged positive.

3. The communication system as set forth in claim 2, wherein the communication apparatus specified by said communication apparatus going to acquire transmission right further comprises:

accumulating means for retaining the received output data; and means for executing output processing on the basis of the output data retained in said accumulating means, when input of requesting re-output is accepted.

4. The communication system as set forth in claim 2, wherein, at the time of requesting the acquisition of transmission right, said specifying means accepts input of specifying a communication apparatus as a main target of output.

5. The communication system as set forth in claim 2, wherein, at the time of transmitting the output data, said specifying means accepts input of specifying a communication apparatus as a main target of output.

6. The communication system as set forth in claim 2, further including a repeating apparatus for relaying communication among a plurality of communication apparatuses, wherein said repeating apparatus comprises recording means for retaining the output data received from the one communication apparatus, corresponding to information indicating the specified communication apparatus, said communication apparatus specified by said communication apparatus going to acquire transmission right further comprises means for transmitting to said repeating apparatus a retransmission request for output data when input of requesting re-output of the output data is accepted, and said repeating apparatus further comprises means for transmitting the output data retained in said recording means to the apparatus as the transmission source of the retransmission request, on the basis of the received retransmission request.

7. The communication system as set forth in claim 6, wherein, at the time of requesting the acquisition of transmission right, said specifying means accepts input of specifying a communication apparatus as a main target of output.

8. The communication system as set forth in claim 6, wherein, at the time of transmitting the output data, said specifying means accepts input of specifying a communication apparatus as a main target of output.

9. The communication system as set forth in claim 8, wherein, at the time of transmitting the output data, when the specifying of a communication apparatus as a main target of output is accepted, said specifying means further notifies information indicating said specified communication apparatus to the other communication apparatuses.

10. The communication system as set forth in claim 9, wherein said output data contains the information indicating the specified communication apparatus, and said each communication apparatus further comprises means for judging whether the apparatus itself has been specified, on the basis of the information contained in the received output data.

11. The communication system as set forth in claim 10, wherein said each communication apparatus further comprises voice inputting means for accepting input of voice, and voice outputting means for outputting voice, said output data is voice data based on the voice the input of which has been accepted by said voice inputting means, and said means for executing output processing causes said voice outputting means to output voice on the basis of the voice data.

12. The communication system as set forth in claim 11, wherein each communication apparatus further comprises means for changing the sound volume of the voice outputted from said voice outputting means so as to heighten the sound volume when specified by said communication apparatus going to acquire transmission right and/or lower the sound volume when not specified.

13. The communication system as set forth in claim 12, wherein said each communication apparatus further comprises means for granting transmission right to the specified communication apparatus, when acquired transmission right is released.

14. The communication system as set forth in claim 13, wherein said communication apparatus to which transmission right has been granted further comprises means for specifying the communication apparatus having released transmission right.

15. The communication system as set forth in claim 14, wherein said specifying means accepts input of specifying a plurality of communication apparatuses.

16. The communication system as set forth in claim 13, wherein said repeating apparatus further comprises means for granting transmission right to the specified communication apparatus when requests for acquiring transmission right are provided from a plurality of communication apparatuses after said one communication apparatus has released acquired transmission right.

17. The communication system as set forth in claim 16, wherein said specifying means accepts input of specifying a plurality of communication apparatuses.

18. A communication system in which a plurality of communication apparatuses are grouped and communicating data among the grouped plurality of communication apparatuses, and a request is accepted of acquiring transmission right from any communication apparatus among the plurality of communication apparatuses,
> wherein said communication apparatus going to acquire the transmission right comprises:
> an operation unit for accepting operation input by a user;
> a communication unit for communicating data among the grouped communication apparatuses; and
> a first controller connected with said operation unit and said communication unit, said controller capable of:
> > accepting input specifying, as a main target of data being output from said communication apparatus, at least one other communication apparatus among the communication apparatuses; and
> > sending the data being output from said communication apparatus toward said at least one other communication apparatus, in a multi-address calling manner, and
> wherein said at least one other communication apparatus comprises:
> > a second controller capable of executing judgment processing to determine whether received data is specified for said at least one other communication apparatus, when said at least one other communication apparatus receives the data sent in the multi-address calling manner; and
> > a data output unit for executing data output processing of the received data when the judgment processing is judged positive or negative, and
> wherein said second controller is connected with said data output unit and is further capable of executing specification output processing from said data output unit indicating said at least one other communication apparatus is specified, when the judgment processing is judged positive.

19. The communication system as set forth in claim 18, wherein the communication apparatus specified by said communication apparatus going to acquire transmission right further comprises:
> a communication unit for communicating with the other communication apparatuses, an accumulation unit for retaining the output data received by said communication unit; and
> a data output unit for executing output processing on the basis of the output data, and a controller connected with said communication unit, said accumulation unit and said data output unit;
> said controller capable of performing the following operation of executing output processing on the basis of the output data retained in said accumulation unit, when input of requesting re-output is accepted by said operation unit.

20. The communication system as set forth in claim 18, wherein said controller further capable of performing the following operation of, at the time of requesting the acquisition of transmission right, causing said operation unit to accept input of specifying a communication apparatus as a main target of output.

21. The communication system as set forth in claim 18, wherein said controller further capable of performing the following operation of, at the time of transmitting the output data by said communication unit, causing said operation unit to accept input of specifying a communication apparatus as a main target of output.

22. The communication system as set forth in claim 18, further including a repeating apparatus for relaying communication among a plurality of communication apparatuses, wherein
> said repeating apparatus comprises:
> > a communication unit for communicating with a plurality of said communication apparatuses;
> > a recording unit for retaining the output data received from the one communication apparatus through said communication unit, corresponding to information indicating the specified communication apparatus; and
> > a processor connected with said communication unit and said recording unit;
> said controller of said communication apparatus specified by said communication apparatus going to acquire transmission right further capable of performing the following operation of transmitting to said repeating apparatus through said communication unit a retransmission request for output data when input of requesting re-output of the output data is accepted by said operation unit, and
> said processor of said repeating apparatus further capable of performing the following operation of transmitting through said communication unit the output data retained in said recording unit to the apparatus as the transmission source of the retransmission request, on the basis of the retransmission request received by said communication unit.

23. The communication system as set forth in claim 22, wherein said controller of said communication apparatus specified by said communication apparatus going to acquire transmission right further capable of performing the following operation of, at the time of requesting the acquisition of transmission right, causing said operation unit to accept input of specifying a communication apparatus as a main target of output.

24. The communication system as set forth in claim 22, wherein said controller of said communication apparatus specified by said communication apparatus going to acquire transmission right further capable of performing the following operation of, at the time of transmitting the output data, causing said operation unit to accept input of specifying a communication apparatus as a main target of output.

25. The communication system as set forth in claim 24, wherein said controller of said communication apparatus specified by said communication apparatus going to acquire transmission right further capable of performing the following operation of, at the time of transmitting the output data, when said operation unit accepts input of specifying a communication apparatus as a main target of output, notifying information indicating said specified communication apparatus to the other communication apparatuses.

26. The communication system as set forth in claim 25, wherein
> said output data contains the information indicating the specified communication apparatus, and
> said controller of said each communication apparatus further capable of performing the following operation of judging whether the apparatus itself has been specified, on the basis of the information contained in the output data received by said communication unit.

27. The communication system as set forth in claim 26, wherein
> said each communication apparatus further comprises voice input unit for accepting input of voice, and voice output unit for outputting voice, said output data is voice data based on the voice the input of which has been accepted by said voice input unit, and said controller of said each communication apparatus further capable of performing the following operation of causing said voice output unit to output voice on the basis of the voice data.

28. The communication system as set forth in claim 27, wherein said controller of said each communication apparatus further capable of performing the following operation of changing the sound volume of the voice outputted from said voice output unit so as to heighten the sound volume when specified by said communication apparatus going to acquire transmission right and/or lower the sound volume when not specified.

29. The communication system as set forth in claim 28, wherein said controller of said each communication apparatus further capable of performing the following operation of granting transmission right to the specified communication apparatus, when acquired transmission right is released.

30. The communication system as set forth in claim 29, wherein said controller of said communication apparatus to which transmission right has been granted further capable of performing the following operation of specifying the communication apparatus having released transmission right.

31. The communication system as set forth in claim 30, wherein said controller of said communication apparatus to which transmission right has been granted further capable of performing the following operation of causing said operation unit to accept input of specifying a plurality of communication apparatuses.

32. The communication system as set forth in claim 29, wherein said controller of said repeating apparatus further capable of performing the following operation of granting transmission right to the specified communication apparatus when requests for acquiring transmission right are provided from a plurality of communication apparatuses after said one communication apparatus has released acquired transmission right.

33. The communication system as set forth in claim 32, wherein said controller of said repeating apparatus further capable of performing the following operation of causing said operation unit to accept input of specifying a plurality of communication apparatuses.

34. A communication apparatus which is capable of performing communication with a plurality of other apparatuses, performs multi-address calling of output data to the other apparatuses when transmission right is acquired, and executes output processing based on the output data when the output data is received from one of the other apparatuses, comprising:
    means for accepting input specifying a specified apparatus as a main target of output among the other apparatuses;
    means for performing multi-address calling of the output data to the other apparatuses;
    means for executing output processing for all of the output data that is received from the one of the other apparatuses;
    means for executing judgment processing to determine whether the output data received from the one of the other apparatuses is specified for the communication apparatus; and
    means for executing specification output processing indicating the communication apparatus is specified, when specification data indicating that the communication apparatus is the specified apparatus is received from the one of the other apparatuses.

35. A communication apparatus which is capable of performing communication with a plurality of other apparatuses with which it is grouped, comprising:
    an operation unit for accepting operation input by a user;
    a communication unit for communicating with the other apparatuses;
    a data output unit for performing output processing of output data; and
    a controller connected with said operation unit, said communication unit and said data output unit; said controller capable of:
        causing said operation unit to accept input specifying, as a main target of transmission data being output from said communication apparatus after acquiring transmission right, a specified apparatus among the other apparatuses;
        sending the transmission data in a multi-address calling manner;
        determining whether received data received by said communication unit is specified for said communication unit;
        causing said data output unit to execute specification output processing indicating a fact of being specified by the received data when said communication apparatus is specified by the received data; and
        causing said data output unit to execute the data output processing of the received data, regardless of whether said communication apparatus is determined to be specified by the received data.

36. A non-transitory computer-readable storage medium storing a computer program product for controlling a computer to execute a method for grouping a plurality of communication apparatuses and for communicating data among the grouped communication apparatuses, comprising:
    accepting a request of acquiring transmission right from any communication apparatus among the plurality of communication apparatuses;
    by said communication apparatus going to acquire the transmission right, accepting input specifying, as a main target of data being output from said communication apparatus going to acquire the transmission right, at least one other communication apparatus among the communication apparatuses;
    sending the data being output from said communication apparatus that acquired the transmission right toward said at least one other communication apparatus, in a multi-address calling manner;
    executing judgment processing to determine whether received data is specified for said at least one other communication apparatus, on said at least one other communication apparatus receiving the data sent in the multi-address calling manner;
    executing, on said at least one other communication apparatus, data output processing of the received data, when said at least one other communication apparatus has judged negative; and
    executing, on said at least one other communication apparatus, not only the data output processing but also specification output processing indicating a fact of being specified when said at least one other communication apparatus has judged positive.

* * * * *

UNITED STATES PATENT AND TRADEMARK OFFICE
CERTIFICATE OF CORRECTION

PATENT NO. : 9,137,277 B2
APPLICATION NO. : 11/447138
DATED : September 15, 2015
INVENTOR(S) : Takashi Ohno et al.

It is certified that error appears in the above-identified patent and that said Letters Patent is hereby corrected as shown below:

In the Claims

Claim 11, Column 24, Line 32
Delete "voice the" and insert --voice--, therefor.

Claim 27, Column 27, Line 1
Delete "voice the" and insert --voice--, therefor.

Claim 34, Column 27, Line 55
Delete "executing" and insert --executing data--, therefor.

Signed and Sealed this
Sixteenth Day of February, 2016

Michelle K. Lee
*Director of the United States Patent and Trademark Office*